(12) United States Patent
Yamaoka et al.

(10) Patent No.: US 7,126,754 B2
(45) Date of Patent: Oct. 24, 2006

(54) POLARIZATION PLATE WITH OPTICAL COMPENSATION LAYER AND IMAGE DISPLAY DEVICE

(75) Inventors: Takashi Yamaoka, Ibaraki (JP); Junichi Adachi, Ibaraki (JP); Masayuki Kawai, Ibaraki (JP); Nao Murakami, Ibaraki (JP); Hiroyuki Yoshimi, Ibaraki (JP); Shuuji Yano, Ibaraki (JP); Kanako Wasai, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 8 days.

(21) Appl. No.: 10/512,998

(22) PCT Filed: Jun. 17, 2003

(86) PCT No.: PCT/JP03/07636

§ 371 (c)(1),
(2), (4) Date: Oct. 29, 2004

(87) PCT Pub. No.: WO03/107049

PCT Pub. Date: Dec. 24, 2003

(65) Prior Publication Data

US 2005/0117217 A1 Jun. 2, 2005

(30) Foreign Application Priority Data

Jun. 18, 2002 (JP) .............................. 2002-176792

(51) Int. Cl.
*G02B 5/30* (2006.01)
*G02F 1/1335* (2006.01)

(52) U.S. Cl. .................. 359/485; 359/483; 359/494; 349/96; 349/117

(58) Field of Classification Search .................. 349/76, 349/117; 359/487, 491, 494, 500, 583, 584, 359/483, 485
See application file for complete search history.

(56) References Cited

U.S. PATENT DOCUMENTS

| 5,193,020 A | 3/1993 | Shiozaki et al. .............. 359/73 |
| 2003/0017331 A1* | 1/2003 | Okochi et al. ............. 428/343 |
| 2003/0055161 A1* | 3/2003 | Chen et al. ................. 524/801 |
| 2003/0103180 A1 | 6/2003 | Masuda et al. ............. 349/117 |

FOREIGN PATENT DOCUMENTS

DE 4342280 6/1995

(Continued)

*Primary Examiner*—Loha Ben
*Assistant Examiner*—Jack Dinh
(74) *Attorney, Agent, or Firm*—Westerman, Hattori Daniels & Adrian LLP

(57) ABSTRACT

A polarizing plate with an optical compensation layer is provided, which has an excellent peelability and is easy to reattach after mounted on an image display apparatus. A pressure-sensitive adhesive layer satisfying the condition (I) below is formed on both surfaces of an optical compensation layer, and one of the pressure-sensitive adhesive layers is further laminated with a polarizing plate.

condition (I): in the case where a pressure-sensitive adhesive layer causing the optical compensation layer and the polarizing plate to adhere to each other is expressed by a pressure-sensitive adhesive layer (A) and the other pressure-sensitive adhesive layer is expressed by a pressure-sensitive adhesive layer (B) and attached to a glass substrate, the pressure-sensitive adhesive layer (A) causing the optical compensation layer and the polarizing plate to adhere to each other has an adhesive strength exceeding 12 N/25 mm, and the pressure-sensitive adhesive layer (B) causing the optical compensation layer and the glass substrate to adhere to each other has an adhesive strength of 1 to 10 N/25 mm.

33 Claims, 1 Drawing Sheet

FOREIGN PATENT DOCUMENTS

| | | |
|---|---|---|
| DE | 19520660 | 12/1996 |
| DE | 19520704 | 12/1996 |
| EP | 1160591 | 12/2001 |
| JP | 05027118 | 2/1993 |
| JP | 05027119 | 2/1993 |
| JP | 7-230006 | 8/1995 |
| JP | 2660601 | 6/1997 |
| JP | 10-44291 | 2/1998 |
| JP | 2000-186265 * | 7/2000 |
| JP | 2001-323238 | 11/2001 |
| JP | 2001-350018 | 12/2001 |
| JP | 2001-350020 * | 12/2001 |
| JP | 343529 | 12/2001 |
| JP | 2002-267839 | 9/2002 |
| WO | WO 00/39631 | 7/2000 |
| WO | WO 00/44841 | 8/2000 |

\* cited by examiner

POLARIZATION PLATE WITH OPTICAL COMPENSATION LAYER AND IMAGE DISPLAY DEVICE

TECHNICAL FIELD

The present invention relates to a polarizing plate with an optical compensation layer and various image display apparatuses.

BACKGROUND ART

In a liquid crystal display, both surfaces of a liquid crystal cell in which a liquid crystal is retained are generally provided with a polarizing plate. In order to visually compensate for retardation caused by birefringence of the liquid crystal cell in a front direction and an oblique direction, a birefringent layer as an optical compensation layer is disposed between the liquid crystal cell and each of the polarizing plates. In practice, the optical compensation layer and the polarizing plate usually are formed as one piece serving as a polarizing plate with an optical compensation layer (see JP 5(1993)-27118 A and JP 5(1993)-27119 A, for example).

Such a polarizing plate with an optical compensation layer generally has a configuration in which a first pressure-sensitive adhesive layer is formed on one surface of the optical compensation layer and the polarizing plate is made to adhere thereto via this pressure-sensitive adhesive layer. In the polarizing plate with the optical compensation layer, a second pressure-sensitive adhesive layer usually is formed on the other surface of the optical compensation layer. Via this second pressure-sensitive adhesive layer, the polarizing plate with the optical compensation layer is made to adhere to a glass substrate of a liquid crystal cell or the like, so that the polarizing plate with the optical compensation layer is disposed in the liquid crystal display.

For a practical use, the pressure-sensitive adhesive layers have to have some performances, for example, adhesion durability, which prevents partial peeling caused by heat or moisture. On the other hand, if the polarizing plate with the optical compensation layer as described above and the glass substrate are displaced from each other or they inadvertently sandwich foreign matters between them at the time of mounting the polarizing plate on the glass substrate, for example, the polarizing plate has to be peeled off and attached again to the glass substrate. Accordingly, the above-noted pressure-sensitive adhesive layers also need to have reworkability, which allows repeated peeling and attaching. Especially at the time of peeling, there are some cases where the pressure-sensitive adhesive layer is not completely removed and remains on the glass substrate, which is called adhesive residue. In such cases, it takes great effort to reattach the polarizing plate with the optical compensation layer. Moreover, in the case where the pressure-sensitive adhesive and the surface of the glass substrate adhere to each other firmly, the power of peeling the polarizing plate with the optical compensation layer may break the optical compensation layer and a liquid crystal display panel, etc., for example.

DISCLOSURE OF INVENTION

It is an object of the present invention to provide a polarizing plate with an optical compensation layer that has a sufficient adhesiveness when it is used in various image display apparatuses such as a liquid crystal display and can be peeled off without leaving a pressure-sensitive adhesive on the side of the image display apparatus and reattached easily.

In order to achieve the above-mentioned object, a polarizing plate with an optical compensation layer according to the present invention includes an optical compensation layer, pressure-sensitive adhesive layers disposed on respective surfaces of the optical compensation layer, and a polarizing plate attached via one of the pressure-sensitive adhesive layers. Each of the pressure-sensitive adhesive layers satisfies condition (I) below: a pressure-sensitive adhesive layer (A) causing the optical compensation layer and the polarizing plate to adhere to each other has an adhesive strength exceeding 12 N/25 mm, and when the other pressure-sensitive adhesive layer (B) is attached to a glass substrate, the pressure-sensitive adhesive layer (B) causing the optical compensation layer and the glass substrate to adhere to each other has an adhesive strength of 1 to 10 N/25 mm.

As a result of keen examination, the inventors of the present invention came up with the idea of setting the adhesive strength of the pressure-sensitive adhesive layers (A) and (B) to be formed on both sides of the optical compensation layer within the above-mentioned range, namely, the adhesive strength of the pressure-sensitive adhesive layer (A) to be larger than that of the pressure-sensitive adhesive layer (B). In such a polarizing plate with an optical compensation layer having the pressure-sensitive adhesive layers (A) and (B) according to the present invention, the pressure-sensitive adhesive layer (B) has an adhesive strength of at least 1 N/25mm, which is sufficient to adhere to a glass substrate of various image display apparatuses. Also, in the case of peeling after mounting, the polarizing plate with the optical compensation layer peels off from the glass substrate preferentially over the polarizing plate peels off from the optical compensation layer. Further, even after peeling the polarizing plate with the optical compensation layer from various image display apparatuses, no pressure-sensitive adhesive remains on the side of the apparatus (the glass substrate) and it is easy to reattach the polarizing plate with the optical compensation layer back to the apparatus. The above-described polarizing plate with an optical compensation layer according to the present invention is useful in not only a liquid crystal display but also other various image display apparatuses such as an electroluminescence (EL) display, a plasma display (PD) and a field emission display (FED). Incidentally, the adhesive strength of the pressure-sensitive adhesive layer (A) refers to a power necessary for peeling off the optical compensation layer and the polarizing plate from each other in the polarizing plate with the optical compensation layer, while the adhesive strength of the pressure-sensitive adhesive layer (B) refers to a power necessary for peeling off the optical compensation layer and a glass substrate after the polarizing plate with the optical compensation layer is attached to the glass substrate using the pressure-sensitive adhesive layer (B). In addition, the pressure-sensitive adhesive in the present invention refers to a general pressure-sensitive adhesive that allows two objects to adhere to each other and be peeled off from each other.

BEST MODE FOR CARRYING OUT THE INVENTION

Figure 1:
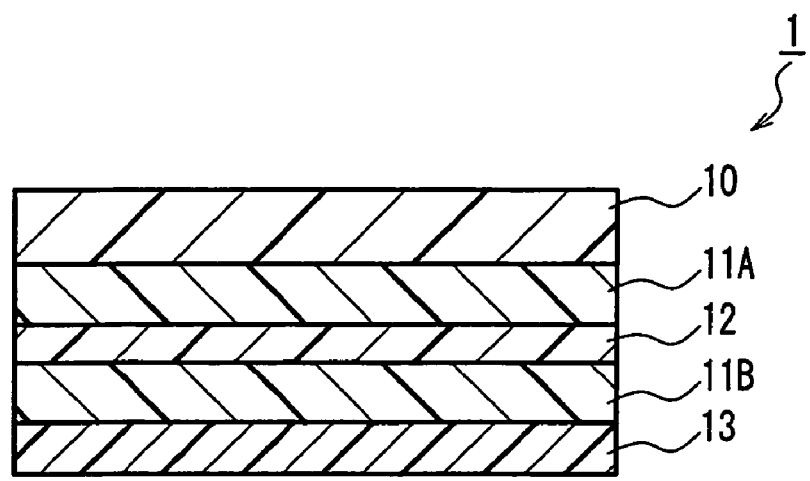
FIG. 1 is a sectional view showing an exemplary polarizing plate with an optical compensation layer according to the present invention.

The following is a description of how to measure the adhesive strength of pressure-sensitive adhesive layers (A) and (B) in the present invention. It should be noted that this measuring method is merely for determining the adhesive strength of each pressure-sensitive adhesive layer and by no means limits a producing method, a use and an application of a polarizing plate with an optical compensation layer according to the present invention.

(Method for Measuring Adhesive Strength of Pressure-Sensitive Adhesive Layer (A))

The adhesive strength of the pressure-sensitive adhesive layer (A) is measured according to JIS Z 0237 "Testing methods of pressure-sensitive adhesive tapes and sheets." More specifically, a polarizing plate with an optical compensation layer 100 mm long and 25 mm wide is produced. Onto the pressure-sensitive adhesive layer (B), a $SiO_2$ surface of $SiO_2$ obliquely-deposited polyethylene terephthalate (with a thickness of 125 μm) is attached using a 2 kg roller (run back and forth once in each direction) and allowed to stand at 25° C. for 20 minutes. Next, under a peeling condition of a temperature of 25° C., a peeling speed of 300 mm/min and an angle of 90°, the polarizing plate and the optical compensation layer of the polarizing plate with the optical compensation layer are peeled off from each other based on the above-noted JIS specification using a tensile testing machine (trade name TMC-1 kNB; manufactured by Minebea Co., Ltd., the same machine also is used in the following), thereby measuring the adhesive strength of the pressure-sensitive adhesive layer (A).

(Method for Measuring Adhesive Strength of Pressure-Sensitive Adhesive Layer (B))

The adhesive strength of the pressure-sensitive adhesive layer (B) is measured according to JIS Z 0237 "Testing method of pressure-sensitive adhesive tapes and sheets." More specifically, a polarizing plate with an optical compensation layer 100 mm long and 25 mm wide is produced and attached to a glass substrate (1737; manufactured by Corning Incorporated) via the pressure-sensitive adhesive layer (B) by running a 2 kg roller back and forth once in each direction. Then, after they are allowed to stand at 25° C. for 20 minutes, the polarizing plate with the optical compensation film and the glass substrate are peeled off from each other under a peeling condition of a temperature of 25° C., a peeling speed of 300 mm/min and an angle of 90° based on the above-noted JIS specification using the above-mentioned tensile test machine, thereby measuring the adhesive strength of the pressure-sensitive adhesive layer (B).

As described above, the adhesive strength of the pressure-sensitive adhesive layer (A) exceeds 12 N/25 mm. This is because the adhesive strength of lower than this value may cause the polarizing plate and the optical compensation layer to adhere insufficiently. The adhesive strength of the pressure-sensitive adhesive layer (A) preferably is equal to or larger than 15 N/25 mm and more preferably is equal to or larger than 20 N/25 mm. It should be noted that there is no particular limitation on the upper limit.

As described above, the adhesive strength of the pressure-sensitive adhesive layer (B) is 1 to 10 N/25 mm. This is because the adhesive strength of smaller than 1 N/25 mm may cause some problems in adhesiveness, especially, adhesion durability when being mounted in various image display apparatuses. On the other hand, the value exceeding 10 N/25 mm makes it difficult to peel off the polarizing plate with the optical compensation layer from the glass substrate of the image display apparatus after mounting and leads to a problem that the pressure-sensitive adhesive remains partially on the glass substrate even after peeling. The adhesive strength ranges preferably from 1.5 to 9.5 N/25 mm and more preferably from 2 to 9 N/25 mm.

In the polarizing plate with the optical compensation layer according to the present invention, the material for forming the pressure-sensitive adhesive layers (A) and (B) is not particularly limited as long as it can set the adhesive strength of the pressure-sensitive adhesive layers to be formed within the above-mentioned range. For example, an acrylic pressure-sensitive adhesive containing an acrylic polymer, a pressure-sensitive adhesive containing a silicone-based polymer and a pressure-sensitive adhesive containing a rubber-based polymer are preferable. Among them, the pressure-sensitive adhesive containing the acrylic polymer is particularly preferable.

The glass transition temperature of various polymers contained in the pressure-sensitive adhesive preferably is equal to or lower than 0°C., more preferably is –80° C. to –5° C. and particularly preferably is –60° C. to –10° C. More specifically, when the polymer is the acrylic polymer, its glass transition temperature preferably is equal to or lower than 0° C., more preferably is –80° C. to –5° C. and particularly preferably is –60° C. to –10° C.

It is preferable that the above-noted acrylic polymer is a polymer in which monomer units described below are polymerized or copolymerized. The monomer units may be any one kind of those described below or a combination of two or more kinds.

The monomer units can be alkyl metha-acrylate. Preferable is a polymer in which the monomer units are polymerized or copolymerized, with this monomer unit of alkyl metha-acrylate being a main skeleton. The metha-acrylate refers to acrylate or methacrylate. The average number of carbons in an alkyl group of the alkyl metha-acrylate is, for example, about 1 to 12. Specific examples of the metha-acrylate include methyl metha-acrylate, ethyl metha-acrylate, butyl metha-acrylate, 2-ethylhexyl metha-acrylate and isooctyl metha-acrylate.

The monomer unit to be copolymerized with the alkyl metha-acrylate (in the following, referred to as the "copolymerized monomer") preferably has a functional group that reacts with a polyfunctional compound described later. The functional group can be, for example, a carboxyl group, a hydroxyl group or an epoxy group. The monomer having the carboxyl group can be, for example, an acrylic acid, a methacrylic acid, a fumaric acid, a maleic acid or an itaconic acid. The monomer having the hydroxyl group can be, for example, 2-hydroxyethyl metha-acrylate, hydroxybutyl metha-acrylate, hydroxyhexyl metha-acrylate or N-methylol metha-acrylamide. The monomer having the epoxy group can be glycidyl metha-acrylate.

Also, a monomer unit having the element N can be introduced into the above-noted acrylic polymer, for example. The above-noted monomer containing the element N can be, for example, metha-acrylamide, N,N-dimethyl metha-acrylamide, N,N-diethyl metha-acrylamide, metha-acryloyl morpholine, metha-acetonitrile, vinylpyrrolidone, N-cyclohexyl maleimide, itaconimide or N,N-dimethyl aminoethyl metha-acrylamide. Other than the above, vinyl acetate, styrene or the like further can be introduced as long as a performance as the pressure-sensitive adhesive is not impaired.

The ratio of the monomer unit in the acrylic polymer is not particularly limited as long as the above-mentioned adhesive strength of the pressure-sensitive adhesive layers (A) and (B) is satisfied. For example, with respect to 100 parts by weight of the alkyl metha-acrylate serving as the main skeleton, 0.1 to 12 parts by weight of the copolymerized monomer is preferable, and 0.5 to 10 parts by weight thereof is more preferable.

The following is an example of the combination of the acrylic polymers in the pressure-sensitive adhesive (A) used in the pressure-sensitive adhesive layer (A) and the pressure-sensitive adhesive (B) used in the pressure-sensitive adhesive layer (B).

When the acrylic polymer in the pressure-sensitive adhesive (A) is a copolymer of butyl acrylate and an acrylic acid, the acrylic polymer in the pressure-sensitive adhesive (B) can be a copolymer of 2-ethylhexyl acrylate and an acrylic acid. In this case, it is preferable that the weight ratio (a:b) between the butyl acrylate (a) and the acrylic acid (b) in the copolymer is 100:4 to 100:7 and the weight ratio (c:d) between the 2-ethylhexyl acrylate (c) and the acrylic acid (d) in the copolymer is 100:4 to 100:7. It is more preferable that the weight ratio (a:b) between the butyl acrylate (a) and the acrylic acid (b) in the copolymer is 100:4 to 100:6 and the weight ratio (c:d) between the 2-ethylhexyl acrylate (c) and the acrylic acid (d) in the copolymer is 100:4 to 100:6. It is particularly preferable that the weight ratio (a:b) between the butyl acrylate (a) and the acrylic acid (b) in the copolymer is 100:5 and the weight ratio (c:d) between the 2-ethylhexyl acrylate (c) and the acrylic acid (d) in the copolymer is 100:5.

The acrylic polymer in each of the pressure-sensitive adhesives (A) and (B) may be a copolymer of butyl acrylate and an acrylic acid as long as the ratios of monomers are different. In this case, the monomer ratio of each acrylic polymer in these pressure-sensitive adhesives preferably is as follows. It is preferable that the weight ratio (a:b) between the butyl acrylate (a) and the acrylic acid (b) of the acrylic polymer in the pressure-sensitive adhesive (A) is 100:4 to 100:7 and the weight ratio (a':b') between the butyl acrylate (a') and the acrylic acid (b') of the acrylic polymer in the pressure-sensitive adhesive (B) is 100:0.5 to 100:3.5. More specifically, it is preferable that the weight ratio (a:b) between the butyl acrylate (a) and the acrylic acid (b) of the acrylic polymer in the pressure-sensitive adhesive (A) is 100:5 and the weight ratio (a':b') between the butyl acrylate (a') and the acrylic acid (b') of the acrylic polymer in the pressure-sensitive adhesive (B) is 100:3. It is also preferable that the weight ratio (a:b) between the butyl acrylate (a) and the acrylic acid (b) of the acrylic polymer in the pressure-sensitive adhesive (A) is 100:5 and the weight ratio (a':b') between the butyl acrylate (a') and the acrylic acid (b') of the acrylic polymer in the pressure-sensitive adhesive (B) is 100:2. In the case where the kind of the monomers contained in the acrylic polymer is the same, it is possible to reduce the amount of the "acrylic acid" added to an alkyl metha-acrylic acid, for example, thereby adjusting the adhesive strength of the pressure-sensitive adhesive (B), which is smaller than that of the pressure-sensitive adhesive (A).

Other than the above, there can be combinations listed below. It is preferable that the acrylic polymer in the pressure-sensitive adhesive (A) is, for example, a butyl acrylate/acrylic acid/hydroxyethyl acrylate copolymer and its blend ratio (weight ratio) is 4 to 6 parts by weight of the acrylic acid and 0.05 to 0.1 parts by weight of the hydroxyethyl acrylate with respect to 100 parts by weight of the butyl acrylate. On the other hand, it is preferable that the acrylic polymer in the pressure-sensitive adhesive (B) is, for example, an isooctyl acrylate/hydroxyhexyl acrylate copolymer and its blend ratio is 0.05 to 0.1 parts by weight of the hydroxyhexyl acrylate with respect to 100 parts by weight of the isooctyl acrylate. Also, it is preferable that the acrylic polymer in the pressure-sensitive adhesive (B) is, for example, a butyl acrylate/hydroxybutyl acrylate copolymer and its blend ratio (polymerization ratio) is 0.5 to 3 parts by weight of the hydroxybutyl acrylate with respect to 100 parts by weight of the butyl acrylate.

The weight-average molecular weight of the acrylic polymer is not particularly limited but preferably is at least 500,000 and usually is about 500,000 to 2,500,000.

Adhesiveness of the pressure-sensitive adhesive layer can be controlled suitably by a conventionally known method. For example, the degree of cross-linkage and the molecular weight will be adjusted on the basis of a composition or molecular weight of the base polymer for forming the pressure-sensitive adhesive, a cross-linking method, a content ratio of the crosslinkable functional group, and a ratio of the blended cross-linking agent.

There is no particular limitation on the method for producing the acrylic polymer. The acrylic polymer can be prepared by a conventionally known method such as polymerizing various monomers described above. More specifically, a radical polymerization method such as a bulk polymerization method, a solution polymerization method and a suspension polymerization method can be selected suitably. Among them, the solution polymerization method is preferable. In the solution polymerization method, various monomers described above are polymerized in a solution. As the solvent, a polar solvent such as ethyl acetate or toluene generally can be used. There also is no particular limitation on the polymerization condition, and a conventionally known condition can be adopted. For example, the reaction temperature usually is about 50° C. to 85° C., and the reaction time is about 1 to 8 hours. Further, in the case of carrying out the radical polymerization, a polymerization initiator therefor can be, for example, a conventionally known initiator based on an azo group or a peroxide.

Usually, a polyfunctional compound also may be present. The polyfunctional compound can be, for example, an organic cross-linking agent or a polyfunctional metal chelate. Examples of the organic cross-linking agent include an epoxy-based cross-linking agent, an isocyanate-based cross-linking agent and an imine-based cross-linking agent, and the isocyanate-based cross-linking agent is particularly preferable. The polyfunctional metal chelate generally is obtained by a covalent bond or a coordinate bond of a polyvalent metal and an organic compound. The above-noted polyvalent metal atom may be Al, Cr, Zr, Co, Cu, Fe, Ni, V, Zn, In, Ca, Mg, Mn, Y, Ce, Sr, Ba, Mo, La, Sn or Ti. The organic compound may be alkyl esther, an alcoholic compound, a carboxylic acid compound, an ether compound or a ketone compound. It is preferable that the organic compound forms a covalent bond or a coordinate bond to the polyvalent metal atom and an oxygen atom.

The blend ratio of the polyfunctional compound is not particularly limited. However, with respect to 100 parts by weight of the acrylic polymer (solids), about 0.01 to 6 parts by weight of the polyfunctional compound (solids) is usually preferable and about 0.1 to 3 parts by weight thereof is more preferable.

In the present invention, it is preferable that a surface of the pressure-sensitive adhesive layer (B) is provided with a release film (a liner). Such a release film can cover the surface of the pressure-sensitive adhesive layer so as to prevent contamination of the exposed surface of the pressure-sensitive adhesive layer (B) and maintain the adhesive strength thereof until the polarizing plate with the optical compensation layer according to the present invention is attached via the pressure-sensitive adhesive layer (B) to an image display apparatus for use. This release film can be made of a suitable film such as the above-mentioned transparent protective film (such as polyester film) coated with a release agent if required. The release agent may be selected, for example, from a silicone-based agent, a long-chain alkyl-based agent, a fluorine-based agent, an agent comprising molybdenum sulfide or the like. Since the release film is peeled off when using the polarizing plate with the optical compensation layer of the present invention, its thickness is not particularly limited but may be similar to that of a conventionally known film.

In the present invention, an undercoat layer may be provided between the optical compensation layer and the pressure-sensitive adhesive layer (B). With this undercoat layer, the optical compensation layer and the pressure-sensitive adhesive layer (B) adhere to each other more firmly, making it possible to prevent further the pressure-sensitive adhesive from remaining on the glass substrate when the polarizing plate with the optical compensation layer is peeled off from the glass substrate of various image display apparatuses after mounting.

The undercoat layer preferably is formed of a compound based on organic substances, for example. The compound based on organic substances preferably has reactivity with the carboxyl group of the acrylic polymer. Further, the material for forming the undercoat layer desirably has a high transparency and an excellent durability. For example, it is preferable that the compound based on organic substances has, within one molecule, two or more functional groups capable of reacting with the carboxyl group of an epoxy-based compound, an isocyanate-based compound and an imine-based compound. Also, a mixture of the acrylic polymer and the compound based on organic substances and an organic compound such as polyethylene imine are effective. Among these compounds based on organic substances, isocyanate-based materials such as trimethylolpropane tolylene diisocyanate and diphenylmethane triisocyanate are particularly preferable.

In the present invention, the polarizing plate may be formed of a polarizer alone or prepared by laminating at least one surface of the polarizer with a transparent protective layer. In the case of laminating both surfaces of the polarizer with the transparent protective layers, it may be possible to use the transparent protective layers of the same kinds or different kinds.

The thickness of the polarizer ranges preferably from 5 to 80 μm, for example, more preferably from 10 to 50 μm, and particularly preferably from 20 to 40 μm. The thickness of the transparent protective layer ranges preferably from 10 to 100 μm, more preferably from 20 to 90 μm, and particularly preferably from 30 to 80 μm. Further, the total thickness of the polarizing plate ranges preferably from 80 to 200 μm, for example, more preferably from 90 to 190 μm and particularly preferably from 100 to 180 μm.

The polarizer is not particularly limited but can be a conventionally known polarizing film. More specifically, it is possible to use a film prepared by a conventionally known method of, for example, dyeing by allowing a film of various kinds to adsorb a dichroic material such as iodine or a dichroic dye, followed by cross-linking, stretching and drying. Especially, films that transmit linearly polarized light when natural light is made to enter those films are preferable, and films having excellent light transmittance and polarization degree are preferable. Examples of the film of various kinds in which the dichroic material is to be adsorbed include hydrophilic polymer films such as PVA-based films, partially-formalized PVA-based films, partially-saponified films based on ethylene-vinyl acetate copolymer and cellulose-based films. Other than the above, polyene-aligned films such as dehydrated PVA and dehydrochlorinated polyvinyl chloride can be used, for example. Among them, the PVA-based film is preferable. In addition, the thickness of the polarizing film generally ranges from 1 to 80 μm and preferably ranges from 5 to 80 μm, though it is not limited to this.

As an example of the method for producing the polarizer, a PVA-based film is immersed and dyed in an iodine aqueous solution, then stretched uniaxially to 3 to 7 times its original length. Furthermore, as necessary, boric acid, zinc sulfate, zinc chloride or the like may be added to the iodine aqueous solution. Also, the PVA-based film may be immersed and washed in water before dyeing, as necessary, in order to wash off dirt or an anti-blocking agent on the surface of the PVA-based film or swell the film so as to prevent nonuniform dyeing. Moreover, the above-described stretching process may be carried out before, after or during the dyeing process. In addition, the film may be stretched in an aqueous solution of a boric acid or potassium iodide or in a water bath.

The transparent protective layer is not particularly limited but can be a conventionally known transparent film. For example, transparent protective films having excellent transparency, mechanical strength, thermal stability, moisture shielding property and isotropism are preferable. Specific examples of materials for such a transparent protective layer can include cellulose-based resins such as triacetylcellulose, and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in view of the polarization property and durability.

Moreover, the polymer film described in JP 2001-343529 A (WO 01/37007) also can be used. The polymer material used can be a resin composition containing a thermoplastic resin whose side chain has a substituted or unsubstituted imido group and a thermoplastic resin whose side chain has a substituted or unsubtituted phenyl group and nitrile group, for example, a resin composition containing an alternating copolymer of isobutene and N-methyl maleimide and an acrylonitrile-styrene copolymer. Alternatively, the polymer film may be formed by extruding the resin composition.

It is preferable that the transparent protective layer is colorless. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloration (optical coloration) of the polarizing plate, which is caused by the protective film, can be solved sufficiently. In the equation below, nx, ny, nz respectively indicate refractive indices in an X-axis direction, a Y-axis direction and a Z-axis direction of the transparent protective layer. The X-axis direction is an axial direction exhibiting a maximum refractive index within the plane, the Y-axis direction is an axial direction perpendicular to the X axis within the plane, and the Z-axis direction is a thickness direction perpendicular to the X axis and the Y axis. Further, d indicates the thickness of the transparent protective layer.

$$Rth=[\{(nx+ny)/2\}-nz] \cdot d$$

The transparent protective layer further may have an optically compensating function. As such a transparent protective layer having the optically compensating function, it is possible to use, for example, a known layer used for preventing coloration caused by changes in a visible angle based on retardation in a liquid crystal cell or for widening a preferable viewing angle. Specific examples include various films obtained by stretching the above-described transparent resins uniaxially or biaxially, an aligned film of a liquid crystal polymer or the like, and a laminate obtained by providing an aligned layer of a liquid crystal polymer on a transparent base. Among the above, the aligned film of a liquid crystal polymer is preferable because a wide viewing angle with excellent visibility can be achieved. Particularly preferable is an optically compensating retardation plate obtained by supporting an optical compensation layer with the above-mentioned triacetylcellulose film or the like, where the optical compensation layer is made of an incline-aligned layer of a discotic or nematic liquid crystal polymer. This optically compensating retardation plate can be a commercially available product, for example, "WV film (trade name)" manufactured by Fuji Photo Film Co., Ltd. Alternatively, the optically compensating retardation plate can be prepared by laminating two or more layers of the retardation film and the film support of triacetylcellulose film or the like so as to control the optical characteristics such as retardation.

The thickness of the transparent protective layer is not particularly limited but can be determined suitably according to retardation or protection strength, for example. In general, the thickness is in the range of up to 5 mm, preferably of up to 1 mm, more preferably from 1 to 500 μm, and particularly preferably from 5 to 150 μm.

The transparent protective layer can be formed suitably by a conventionally known method such as a method of coating the polarizing film with the above-mentioned various transparent resins or a method of laminating the transparent resin film, the optically compensating retardation plate or the like on the polarizing film, or can be a commercially available product.

The transparent protective layer further may be subjected to, for example, a hard coating treatment, an antireflection treatment, treatments for anti-sticking, diffusion and anti-glaring and the like. The hard coating treatment aims at preventing scratches on the surfaces of the polarizing plate, and is a treatment of, for example, providing a hardened coating film that is formed of a curable resin and has excellent hardness and smoothness onto a surface of the transparent protective layer. The curable resin can be, for example, ultraviolet-curing resins of silicone base, urethane base, acrylic, and epoxy base. The treatment can be carried out by a conventionally known method. The anti-sticking treatment aims at preventing adjacent layers from sticking to each other. The antireflection treatment aims at preventing reflection of external light on the surface of the polarizing plate, and can be carried out by forming a conventionally known antireflection layer or the like.

The anti-glare treatment aims at preventing reflection of external light on the polarizing plate surface from hindering visibility of light transmitted through the polarizing plate. The anti-glare treatment can be carried out, for example, by providing microscopic asperities on a surface of the transparent protective layer by a conventionally known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 μm, though there is no specific limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no specific limitation.

An anti-glare layer in which the transparent fine particles are blended can be used as the transparent protective layer itself or provided as a coating layer applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer and the anti-glare layer mentioned above can be laminated on the polarizing plate, as a sheet of optical layers comprising these layers, separately from the transparent protective layer.

The method for making the polarizer and the transparent protective layer adhere to each other is not particularly limited but can be a conventionally known method. In general, a pressure-sensitive adhesive, an adhesive or the like that is conventionally known can be used. The kinds thereof can be determined suitably depending on materials of the polarizer and the transparent protective layer. The above-noted adhesive is not particularly limited but can be, for example, a polymer adhesive based on an acrylic substance, vinyl alcohol, silicone, polyester, polyurethane, polyether or the like, or a rubber-based adhesive. Among these materials, materials having excellent moisture absorption and heat resistance are preferable. With the material with such properties, when the polarizer of the present invention is used in a liquid crystal display, for example, it is possible to provide a high-quality durable display apparatus that can prevent foaming or peeling caused by moisture absorption, degradation in the optical properties and warping of a liquid crystal cell caused by difference in thermal expansion coefficients and the like.

The pressure-sensitive adhesive, the adhesive or the like described above do not peel off easily even when being exposed to moisture or heat, for example, and have excellent light transmittance and polarization degree. More specifically, polyvinyl alcohol-based adhesives are preferable when the polarizer is a polyvinyl alcohol-based film, in light of stability of adhering treatment. These adhesive and pressure-sensitive adhesive may be applied directly to surfaces of the polarizer and the transparent protective layer, or a tape formed of the pressure-sensitive adhesive may be arranged on the surfaces thereof Further, when these adhesives are prepared as an aqueous solution, for example, other additives or a catalyst such as an acid catalyst may be blended as necessary.

The adhesive layer and the pressure-sensitive adhesive layer can be a monolayer or a laminate. The laminate can include monolayers different from each other in the type or in the compositions. When arranged on both surfaces of the polarizer, they can be the same or can be different from each other in types or compositions.

The thickness of the pressure-sensitive adhesive layer and the adhesive layer can be determined suitably depending on the constituents or the like of the polarizing plate. In general, it is from 1 to 500 nm.

In the present invention, it is preferable that the polarizing plate is subjected to a heating treatment. When the polarizing plate with an optical compensation layer is mounted in a display apparatus, such a heating treatment in advance makes it possible to suppress heat shrinkage of the polarizing plate even under a heating condition. As a result, when the polarizing plate with the optical compensation layer is applied to various image display apparatuses, the generation of irregularities around the perimeter of the display screen can be suppressed further, thereby achieving an image display apparatus with extremely good display characteristics.

Although the condition for the heating treatment of the polarizing plate is not particularly limited, it is preferable that the heated polarizing plate satisfies the following properties. That is, after the heated polarizing plate is treated at 50° C. for 60 minutes, the ratio of dimensional change in an absorption axis direction ranges preferably from −0.3% to +0.3% and more preferably from −0.2% to +0.2%.

As a specific example of the condition, the heating temperature ranges, for example, from 50° C. to 90° C., preferably from 50° C. to 80° C. and more preferably from 50° C. to 70° C. The period for treatment ranges preferably from 3 to 60 minutes, for example, more preferably from 5 to 60 minutes and particularly preferably from 10 to 60 minutes.

In the present invention, the optical compensation layer has a thickness ranging preferably from 0.1 to 20 μm, more preferably from 0.5 to 15 μm and particularly preferably from 0.7 to 10 μm.

In the present invention, it is preferable that the optical compensation layer is a cholesteric layer whose constituent molecules are aligned while having a cholesteric structure.

In the present invention, the cholesteric layer also can be called a layer having a pseudo-layer structure, so-called a planar structure or a Granjean structure, in which the constituent molecules of the layer have a helical structure and a screw axis thereof is aligned substantially perpendicularly to the in-plane direction. Also, the state in which the "constituent molecules have a cholesteric structure" in the present invention is not limited to the case where liquid crystalline compounds are in a cholesteric liquid crystalline phase, for example, but also includes the state where non-liquid crystalline compounds are aligned in a helical manner as in the cholesteric liquid crystalline phase. Incidentally, this state is not a liquid crystalline phase. Accordingly, the constituent molecules of the cholesteric layer can be not only a liquid crystal polymer but also a liquid crystal monomer, for example. This liquid crystal monomer may be polymerized after alignment so as to be a liquid crystal polymer.

It is preferable that the cholesteric layer has refractive indices (nx, ny, nz) in the above-described three axial directions of nx≈ny>nz. An optical compensation layer having such optical characteristics exhibits a negative uniaxiality and can be used as a so-called negative C-Plate retardation plate. Further, an optical compensation layer exhibiting a negative biaxiality (nx>ny>nz) is also preferable.

In the present invention, the cholesteric layer has a selective reflection wavelength range, for example, from 100 to 320 nm, and it is preferable that its upper limit is equal to or shorter than 300 nm. On the other hand, it is preferable that its lower limit is equal to or longer than 150 nm. With such a selective reflection wavelength range, it is possible to avoid coloration of the cholesteric layer and light leakage in a crossed Nicols state in a sufficient manner, for example. Therefore, when the polarizing plate with an optical compensation layer according to the present invention is used in various image display apparatuses, still better display characteristics can be achieved in both of a front direction and an oblique direction.

In the case where the cholesteric layer is formed using a liquid crystal monomer as described later, for example, a center wavelength of the selective reflection wavelength range λ (nm) can be expressed by the equation below.

$$\lambda = n \cdot P$$

In the above equation, n indicates an average refractive index of the liquid crystal monomer, and P indicates a helical pitch (μm) of the cholesteric layer. The average refractive index n is expressed by "$(n_0 + n_e)/2$" and usually ranges from 1.45 to 1.65, with $n_o$ indicating an ordinary index of the liquid crystal monomer and $n_e$ indicating an extraordinary index of the liquid crystal monomer.

It is preferable that the cholesteric layer contains a chiral dopant. The chiral dopant in the present invention is, for example, a chemical compound having a function of aligning constituent molecules such as a liquid crystal monomer or a liquid crystal polymer described later so as to have a cholesteric structure.

The chiral dopant is not particularly limited in kind as long as it can align constituent molecules of the cholesteric layer to have a cholesteric structure as described above, but the chiral dopants that will be described later are preferable, for example.

In these chiral dopants, the helical twisting power thereof preferably is at least $1 \times 10^{-6}$ nm$^{-1} \cdot$(wt %)$^{-1}$, more preferably is at least $1 \times 10^{-5}$ nm$^{-1} \cdot$(wt %)$^{-1}$, further preferably ranges from $1 \times 10^{-5}$ to $1 \times 10^{-2}$ nm$^{-1} \cdot$(wt %) $^{-1}$, and particularly preferably ranges from $1 \times 10^{-4}$ to $1 \times 10^{-3}$ nm$^{-1} \cdot$(wt %)$^{-1}$. By using the chiral dopant with the above helical twisting power, for example, the helical pitch of the formed cholesteric layer can be controlled to the range described below, making it duly possible to control the selective reflection wavelength range to the above-noted range.

In general, the helical twisting power refers to an ability to give a twist to liquid crystal materials such as a liquid crystal monomer and a liquid crystal polymer, which will be described later, thus aligning those materials in a helical manner and is expressed by the equation below.

Helical twisting power=1/[Cholesteric pitch (nm)× Weight ratio of chiral dopant (wt %)]

In the above equation, the weight ratio of chiral dopant refers to the ratio (weight ratio) of the chiral dopant in a mixture containing, for example, a liquid crystal monomer or a liquid crystal polymer and the chiral dopant and is expressed by the equation below.

Weight ratio of chiral dopant (wt %)=[X/(X+Y)]× 100

X: Weight of chiral dopant

Y: Weight of liquid crystal monomer or liquid crystal polymer

Further, the helical pitch in the cholesteric layer is equal to or smaller than 0.25 μm, for example, preferably ranges from 0.01 to 0.25 μm, more preferably ranges from 0.03 to 0.20 μm and particularly preferably ranges from 0.05 to 0.15 μm. The helical pitch of 0.01 μm or larger achieves, for example, a sufficient alignment, whereas the helical pitch of 0.25 μm or smaller makes it possible to suppress sufficiently optical rotatory power on a shorter wavelength side of visible light, for example, thus preventing light leakage sufficiently for use under polarized light. Also, by using the chiral dopant having the above-described helical twisting power, it becomes possible to control the helical pitch of the formed cholesteric layer to the above-noted range.

The above-mentioned cholesteric layer has a single hue b value of preferably 1.2 or smaller, for example, more preferably 1.1 or smaller and particularly preferably 1.0 or smaller. The cholesteric layer within such a range shows very small coloration, for example, and thus achieves extremely good optical characteristics. The single hue b value within such a range can be achieved by, for example, controlling the selective reflection wavelength range to the above-described range.

The single hue b value is defined by the HunterLab colorimetric system (Hunter, R. S.: J. Opt. Soc. Amer., 38, 661(A), 1094(A) (1948); J. Opt. Soc. Amer., 48, 985 (1958)). More specifically, in accordance with JIS K 7105 5.3, for example, tristimulus values (X, Y, Z) of a sample are measured using a spectrophotometer or a photoelectric colorimeter and substituted into the Hunter equation, which is shown below as a color difference equation in the L, a, b space, thereby calculating a single hue b value. Usually, a C light source is used for this measurement. For example, using an integrating-sphere spectral transmittance meter (trade name DOT-3C; manufactured by Murakami Color Research Laboratory), the transmittance as well as the single hue b value can be measured.

Single hue $b=7.0\times(Y-0.847Z)/Y^{1/2}$

Specific examples of the constituent molecules of the cholesteric layer include a liquid crystal monomer. It is preferable that the liquid crystal monomer is aligned while having a cholesteric structure and the liquid crystal monomer is polymerized or cross-linked. With this structure, as described later, because of its liquid crystalline property, the monomer can be aligned while having a cholesteric structure, and this alignment can be fixed by polymerizing the monomer. Although the liquid crystal monomer is used, the polymer that is polymerized by the above fixing comes to have a non-liquid crystalline property. In the case where the chiral dopant, which will be described later, is used for allowing the liquid crystal monomer to have a cholesteric structure, a polymer having a non-liquid crystalline property in which the liquid crystal monomer and the chiral dopant are polymerized or cross-linked is obtained.

As the above-described cholesteric layer, a cholesteric layer in which the liquid crystal monomer is aligned and polymerized or cross-linked is preferable in the following respect. Such a cholesteric layer has a cholesteric structure as in a cholesteric liquid crystalline phase. However, since the liquid crystal monomer has been polymerized and turned into a polymer having a non-liquid crystalline property, there occurs no transformation peculiar to the liquid crystal molecules, i.e., between a liquid crystalline phase, a glassy phase and a crystalline phase due to temperature change. Consequently, an extremely stable optical compensation layer whose cholesteric structure is not affected by temperature change can be achieved, which is useful.

It is preferable that the liquid crystal monomer is represented by the chemical formula (1) below. Although such liquid crystal monomers generally are nematic liquid crystal monomers, the liquid crystal monomer of the present invention is given a twist by the chiral dopant and eventually achieves a cholesteric structure. Also, since the monomer needs to be polymerized or cross-linked for fixing the alignment in the cholesteric layer, it is preferable that the monomer contains at least one of a polymerizable monomer and a cross-linkable monomer.

When using the above-described liquid crystal monomer, it is preferable that the cholesteric layer further contains at least one of a polymerizing agent and a cross-linking agent. An ultraviolet curing agent, a photocuring agent or a thermosetting agent can be used, for example.

The ratio of the liquid crystal monomer in the cholesteric layer preferably ranges from 75 to 95 wt % and more preferably ranges from 80 to 90 wt %. Also, the ratio of a chiral dopant to the liquid crystal monomer preferably ranges from 5 to 23 wt % and more preferably ranges from 10 to 20 wt %. Further, the ratio of the cross-linking agent or the polymerizing agent to the liquid crystal monomer preferably ranges from 0.1 to 10 wt %, more preferably ranges from 0.5 to 8 wt %, and particularly preferably ranges from 1 to 5 wt %.

The constituent molecules of the cholesteric layer may be not only the liquid crystal monomer but also, for example, a liquid crystal polymer. The cholesteric layer may have a structure in which the liquid crystal polymer is aligned while having a cholesteric structure. The liquid crystal polymer may be a homopolymer or a hetero-polymer (copolymer) that is known conventionally, for example, various liquid crystal polymers disclosed in Japanese Patent 2660601.

Other than such a cholesteric layer, it is also possible to use as the optical compensation layer a horizontally-aligned layer or a hybrid-aligned layer of a nematic liquid crystal or a horizontally-aligned layer or a hybrid-aligned layer of a discotic-nematic liquid crystal.

Furthermore, films made of various polymers having a controlled refractive index can be used as the optical compensation layer. Such an optical compensation layer can be provided with a desired birefringence by subjecting various polymer films to a stretching treatment such as a uniaxial stretching or a biaxial stretching, thereby controlling the birefringence in an in-plane direction or a thickness direction of the film. Also, an incline-aligned film formed by stretching or shrinking a polymer film or inclining and aligning a liquid crystal polymer can be used as the optical compensation layer. Polymers used for such films are not particularly limited but may be conventionally known polymers. For example, it is possible to use polycarbonate, cellulose acetate, polyether ketone, polysulfone, polyester, polyvinyl alcohol, polystyrene, polymethyl methacrylate, cyclic polyolefin, polyarylate, polyamide, polyimide and the like.

As described above, the kind of the optical compensation layer is not particularly limited. For example, the cholesteric layer using a liquid crystal monomer can be prepared as follows.

For example, it can be formed by a producing method including forming an expanded layer by expanding onto an alignment base a coating solution that contains a liquid crystal monomer, the chiral dopant and at least one of a polymerizing agent and a cross-linking agent, subjecting the expanded layer to a heating treatment so that the liquid crystal monomer is aligned while having a cholesteric structure, and subjecting the expanded layer to at least one of a polymerization treatment and a cross-linking treatment so as to fix the alignment of the liquid crystal monomer and form the cholesteric layer of a non-liquid crystal polymer.

First, the coating solution that contains the liquid crystal monomer, the chiral dopant and at least one of the polymerizing agent and the cross-linking agent is prepared.

As the liquid crystal monomer, a nematic liquid crystal monomer is preferable, for example. More specifically, a monomer represented by the formula (1) below can be used. The liquid crystal monomer may be one kind or a combination of two or more kinds.

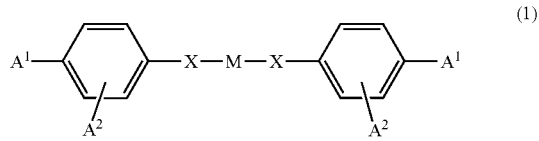
(1)

In the formula (1) above, $A^1$ and $A^2$ are each a polymerizable group and are identical or different, or one of $A^1$ and $A^2$ is hydrogen. X is each a single bond, —O—, —S—, —C=N—, —O—CO—, —CO—O—, —O—CO—O—, —CO—NR—, —NR—CO—, —NR—, —O—CO—NR—, —NR—CO—O—, —CH$_2$—O— or —NR—CO—NR, in which R is H or $C_1$–$C_4$-alkyl, and M is a mesogenic group.

In the formula (1) above, Xs may be identical or different but preferably are identical.

In the monomer of the formula (1) above, $A^2$ preferably is ortho to $A^1$ at each occurrence.

Further, it is preferable that $A^1$ and $A^2$ mentioned above are each, independently from one another, represented by the formula below.

Z-X-(Sp)$_n$ (2)

It is preferable that $A^1$ and $A^2$ are identical.

In the formula (2) above, Z is a crosslinkable group, X is similar to that of the formula (1) above, Sp is a spacer formed of a straight-chain or branched chain alkyl group having 1 to 30 carbon atoms, and n is 0 or 1. The carbon chain in the Sp may be interrupted by ether oxygen, thioether sulfur or nonadjacent imino or $C_1$–$C_4$-alkylimino groups.

In the formula (2) above, it is preferable that Z is any of the radicals represented by the formulae below. In the formulae below, R is, for example, methyl, ethyl, n-propyl, i-propyl, n-butyl, i-butyl or t-butyl.

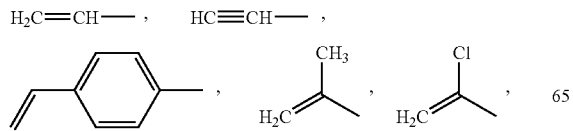

-continued

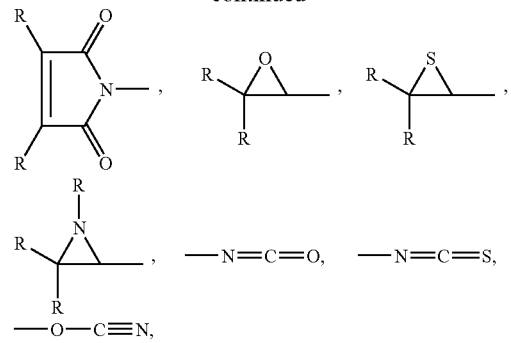

Also, in the formula (2) above, it is preferable that Sp is any of the radicals represented by the formulae below. In the formulae below, it is preferable that m is 1 to 3 and p is 1 to 12.

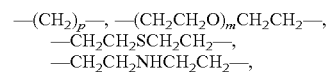

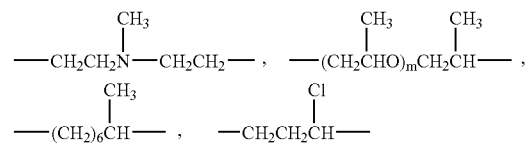

In the formula (1) above, it is preferable that M is represented by formula (3) below. In the formula (3) below, X is similar to X in the formula (1) above. Q is, for example, substituted or unsubstituted alkylene or aromatic hydrocarbon radicals or may be a substituted or unsubstituted straight-chain or branched-chain $C_1$–$C_{12}$-alkylene.

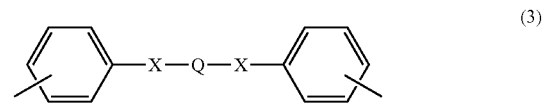
(3)

When Q is the aromatic hydrocarbon radicals, the radicals represented by the formulae below or substituted analogs thereof are preferable, for example.

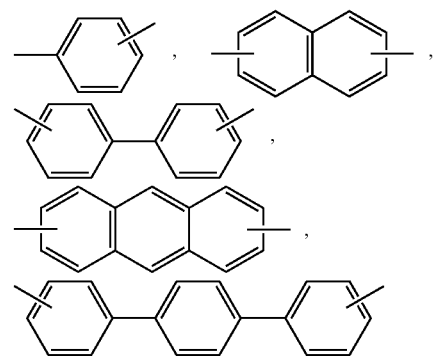

Substituted analogs of the aromatic hydrocarbon radicals represented by the formulae above may carry 1 to 4 substituents per aromatic ring, for example, or one or two substituents per aromatic ring or per group. The substituents may be identical or different. The substituents can be, for example, $C_1$–$C_4$-alkyl, nitro, halogen such as F, Cl, Br or I, phenyl or $C_1$–$C_4$-alkoxy.

Specific examples of the liquid crystal monomer can include monomers represented by the formulae (4) to (19) below.

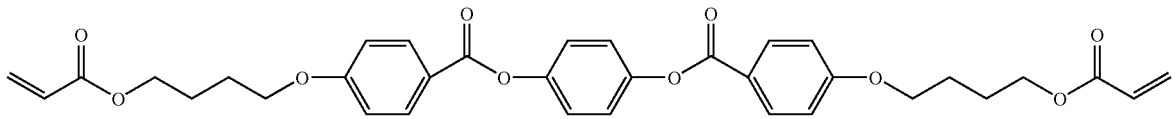

(4)

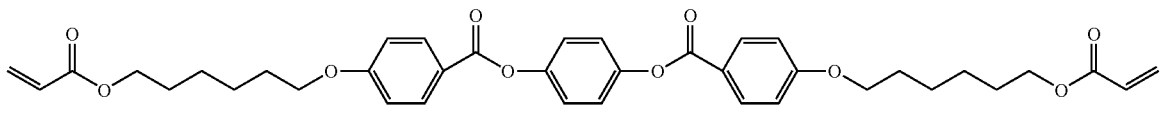

(5)

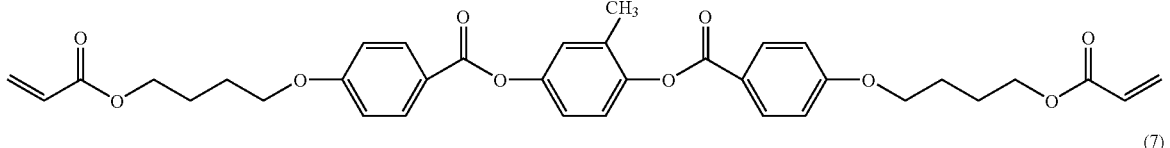

(6)

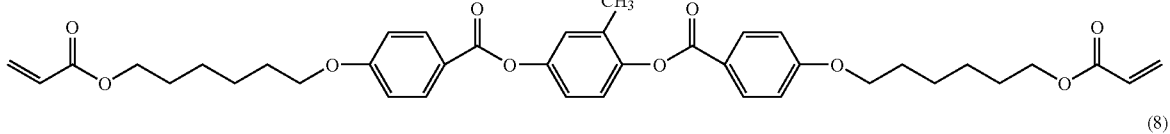

(7)

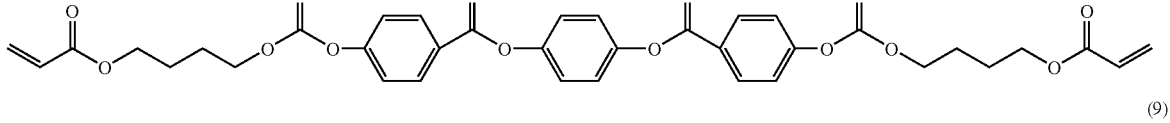

(8)

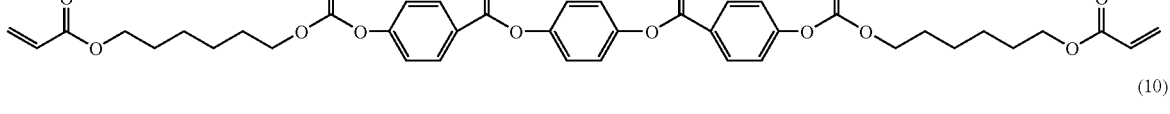

(9)

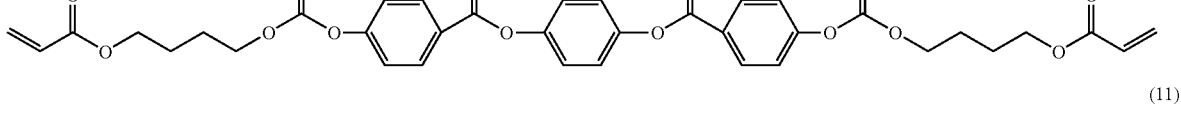

(10)

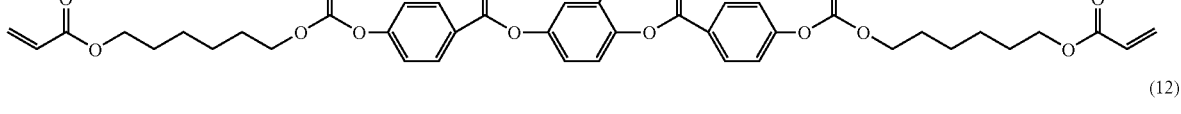

(11)

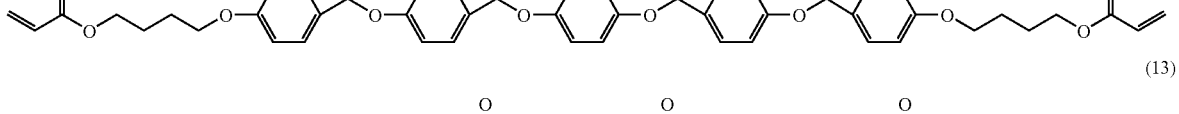

(12)

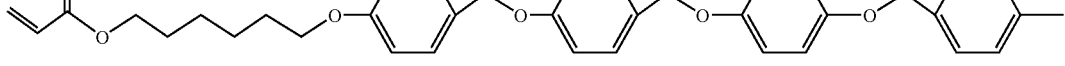

(13)

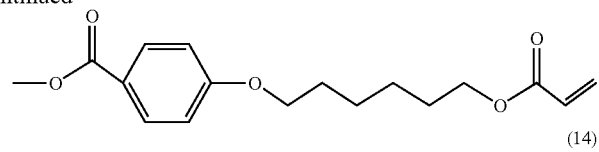
(14)
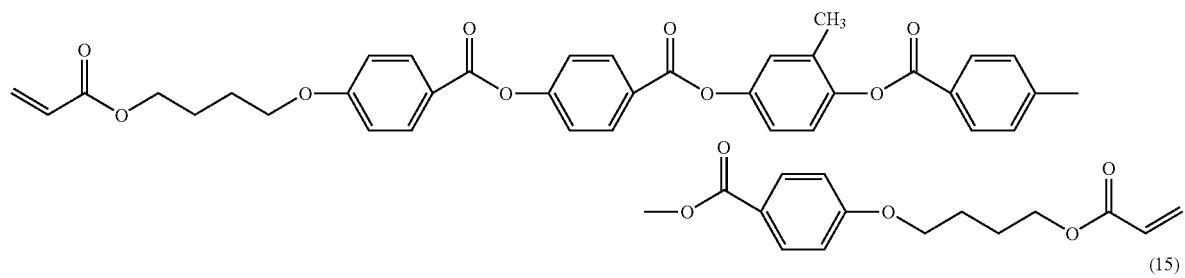
(15)
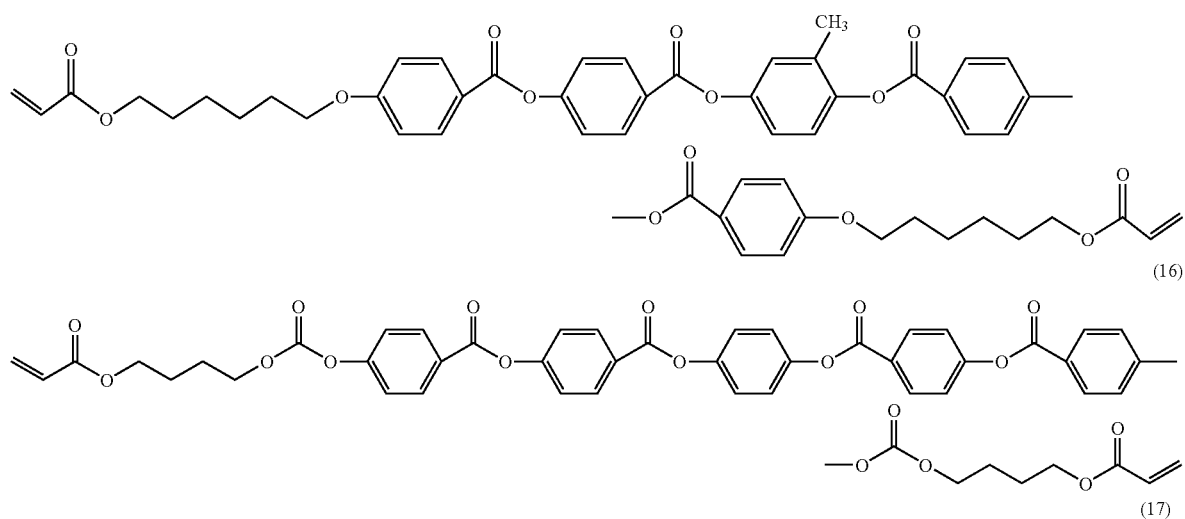
(16)
(17)
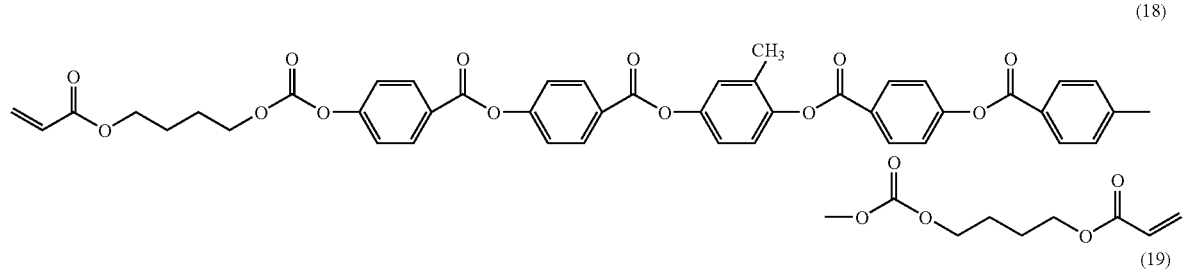
(18)
(19)
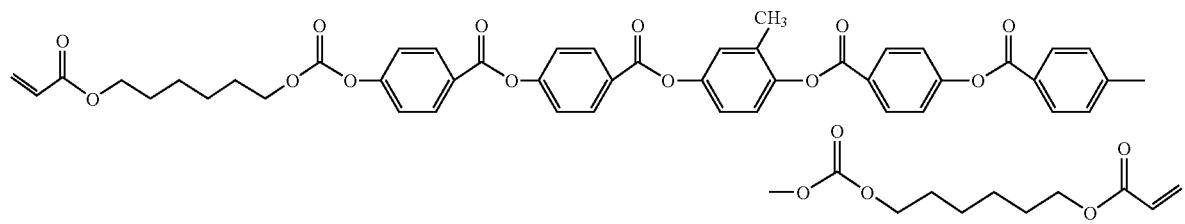

The temperature range in which the liquid crystal monomer shows a liquid crystalline property varies depending on their kinds but preferably ranges from 40° C. to 120° C., for example, more preferably ranges from 50° C. to 100° C. and particularly preferably ranges from 60° C. to 90° C.

Although there is no particular limitation on the chiral dopant as long as it twists and aligns the liquid crystal monomer so as to have a cholesteric structure as described above, for example, a polymerizable chiral dopant is preferable. The above-described chiral dopants can be used. These chiral dopants may be used alone or in combination of two or more.

More specifically, the polymerizable chiral dopant can be, for example, chiral compounds represented by the general formulae (20) to (23) below.

$$(Z-X^5)_n Ch \quad (20)$$

$$(Z-X^2-Sp-X^5)_n Ch \quad (21)$$

$$(P^1-X^5)_n Ch \quad (22)$$

$$(Z-X^2-Sp-X^3-M-X^4)_n Ch \quad (23)$$

In the above formulae, Z is similar to that in the formula (2) above, Sp is similar to that in the formula (2) above, $X^2$, $X^3$ and $X^4$ are each, independently from one another, a chemical single bond, —O—, —S—, —O—CO—, —CO—O—, —O—CO—O—, —CO—NR—, —NR—CO—, —O—CO—NR—, —NR—CO—O— or —NR—CO—NR—, and R is H or $C_1$–$C_4$-alkyl. $X^5$ is a chemical single bond, —O—, —S—, —O—CO—, —CO—O—, —O—CO—O—, —CO—NR—, —NR—CO—, —O—CO—NR—, —NR—CO—O—, —NR—CO—NR, —CH$_2$O—, —O—CH$_2$—, —CH=N—, —N=CH— or —N≡N—. Similarly to the above, R is H or $C_1$–$C_4$-alkyl. Similarly to the above, M is a mesogenic group. $P^1$ is a $C_1$–$C_{30}$-alkyl group, a $C_1$–$C_{30}$-acyl group or a $C_3$–$C_8$-cycloalkyl group substituted by 1 to 3 $C_1$–$C_6$-alkyl, or hydrogen, and n is an integer from 1 to 6. Ch is an n-valent chiral group. In the formula (23) above, it is preferable that at least one of $X^3$ and $X^4$ is —O—CO—O—, —O—CO—NR—, —NR—CO—O— or —NR—CO—NR—. In the formula (22) above, when $P^1$ is an alkyl group, an acyl group or a cycloalkyl group, its carbon chain may be interrupted by ether oxygen, thioether sulfur or nonadjacent imino or $C_1$–$C_4$-alkylimino groups, for example.

Examples of the above-noted chiral group of Ch include radicals represented by the formulae below.

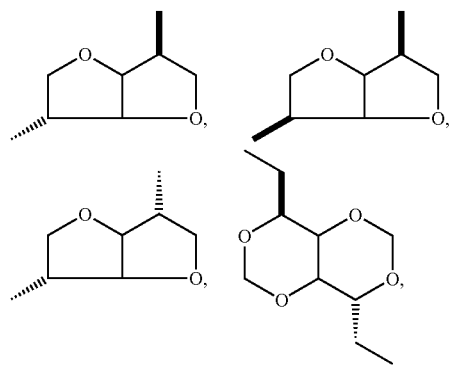

-continued

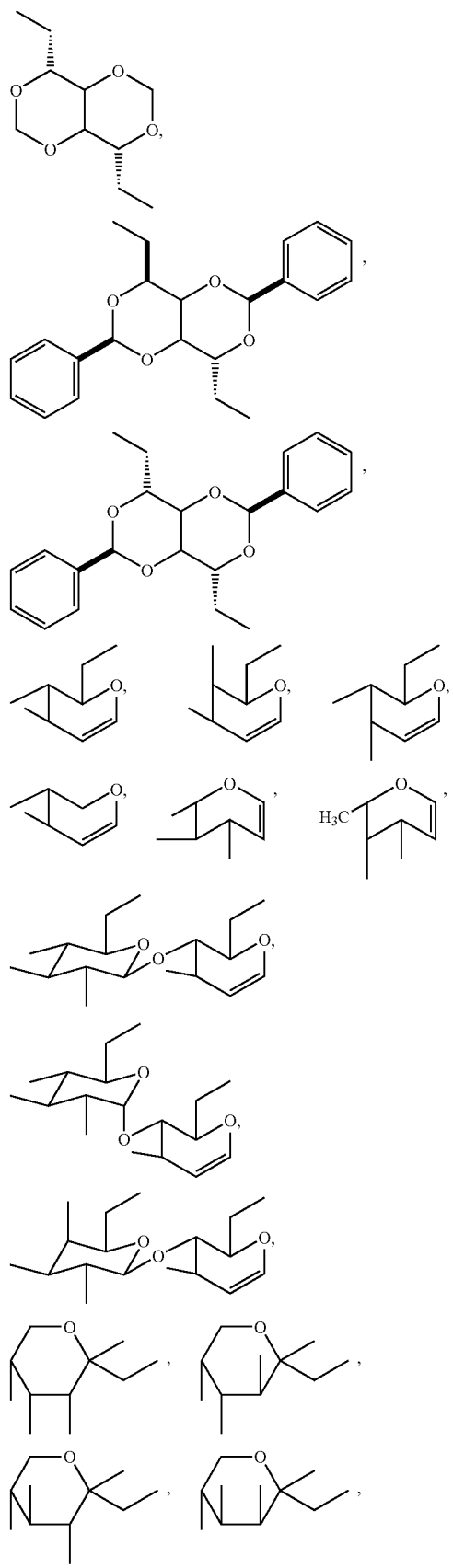

-continued

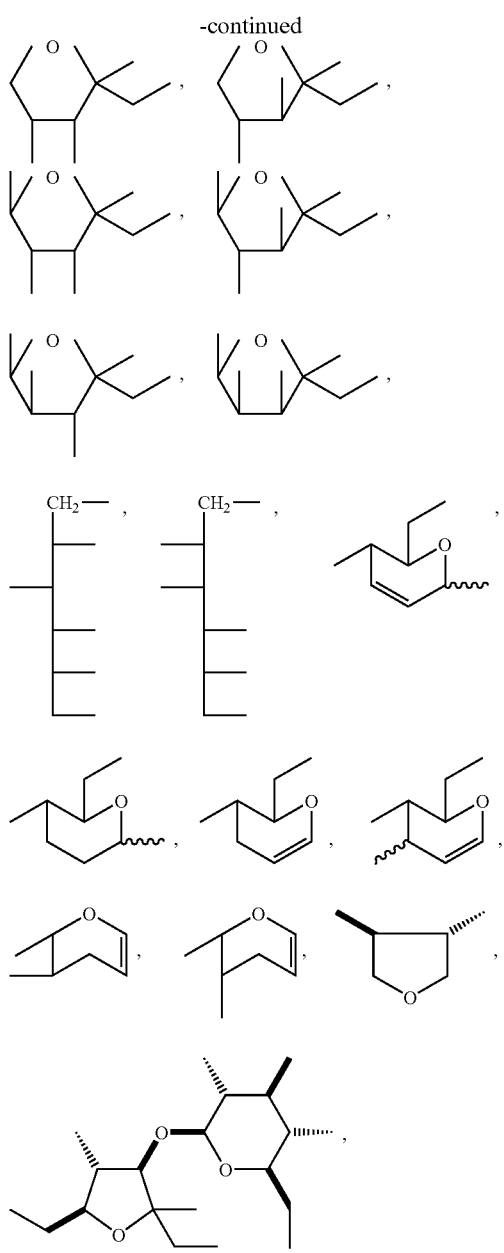

In the above radicals, L is $C_1$–$C_4$-alkyl, $C_1$–$C_4$-alkoxy, halogen, COOR, OCOR, CONHR or NHCOR, and R is $C_1$–$C_4$-alkyl. Terminal ends in the radicals represented by the formulae above indicate dangling bonds with the adjacent groups.

Among the above radicals, radicals represented by the formulae below are particularly preferable.

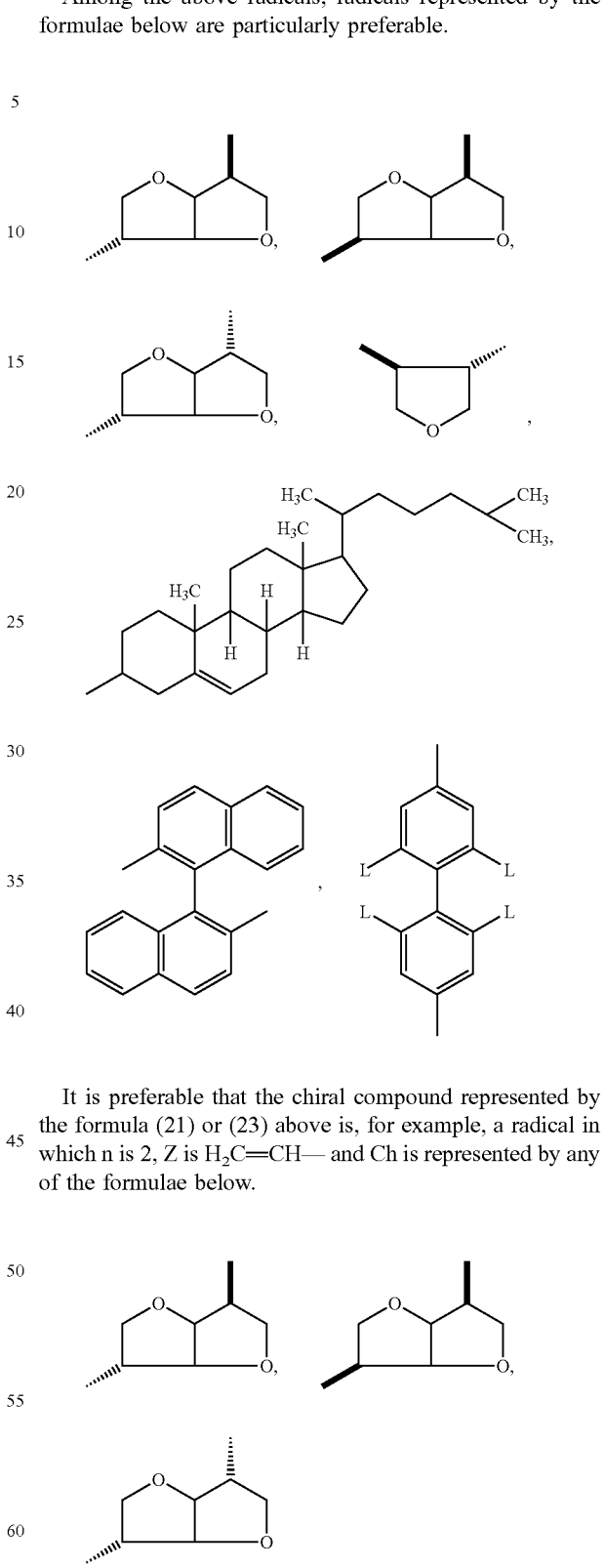

It is preferable that the chiral compound represented by the formula (21) or (23) above is, for example, a radical in which n is 2, Z is $H_2C=CH-$ and Ch is represented by any of the formulae below.

Specific examples of the chiral compound can include compounds represented by the formulae (24) to (44) below. Incidentally, these chiral compounds have a helical twisting power of at least $1 \times 10^{-6}$ $nm^{-1} \cdot (wt\%)^{-1}$.

(24)
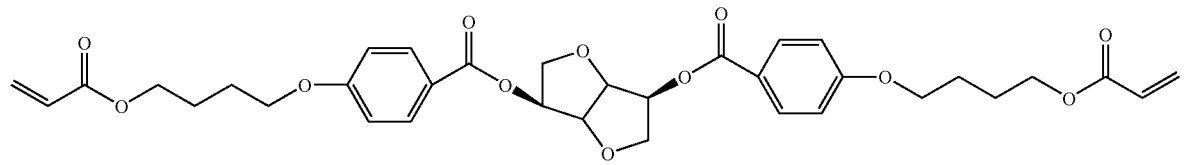
(25)
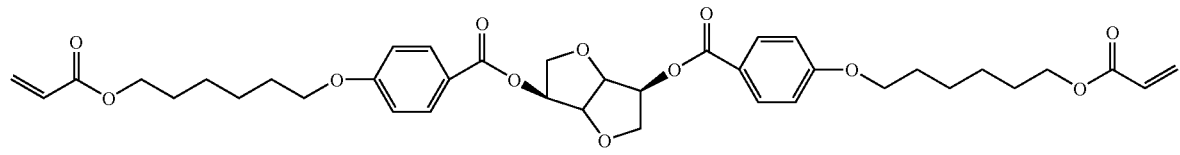
(26)
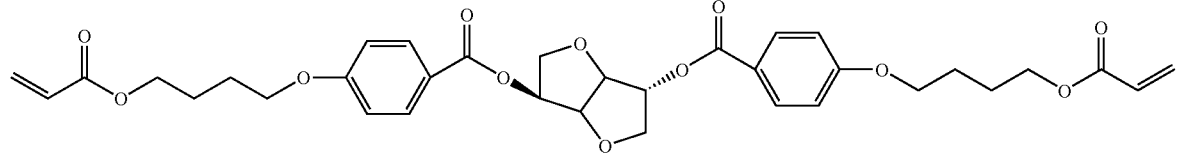
(27)
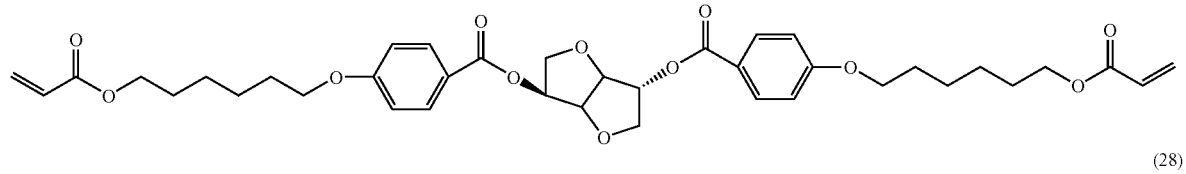
(28)
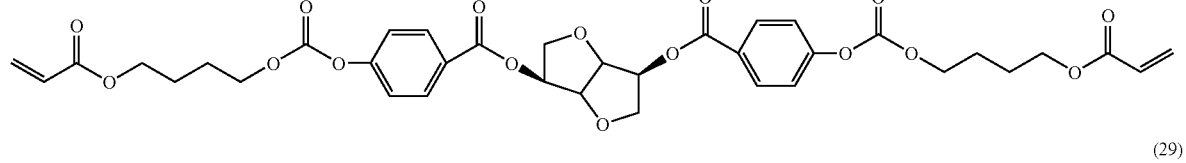
(29)
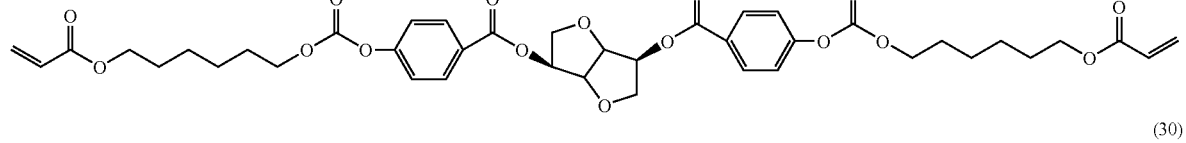
(30)
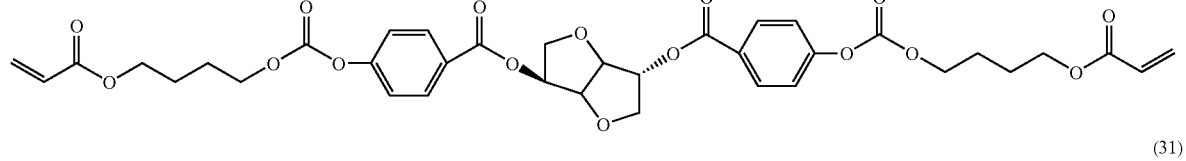
(31)
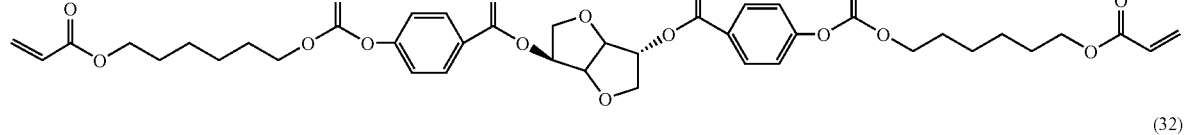
(32)
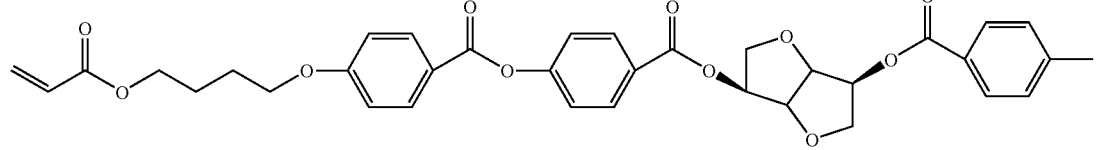

-continued
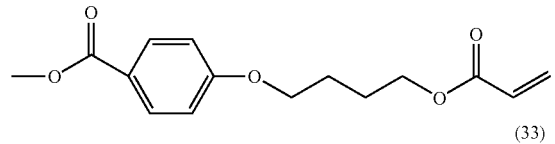
(33)
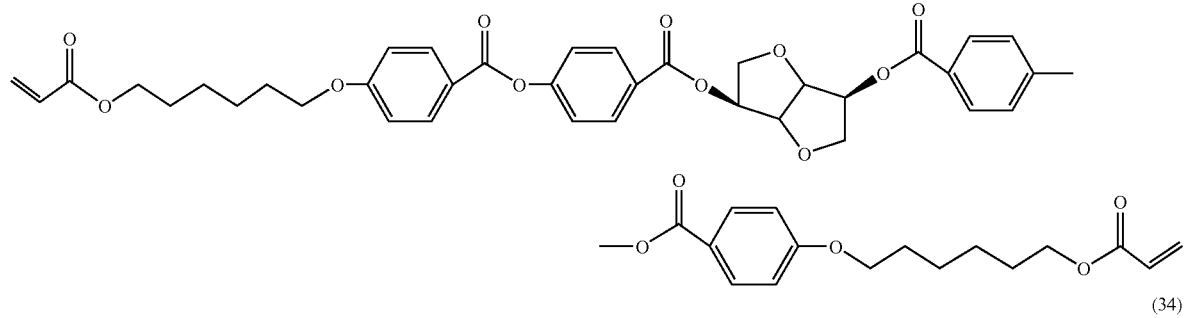
(34)
(35)
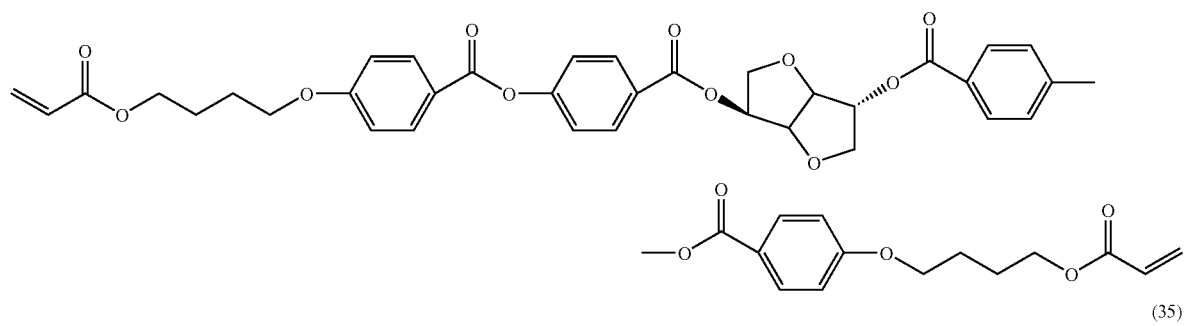
(36)
(37)
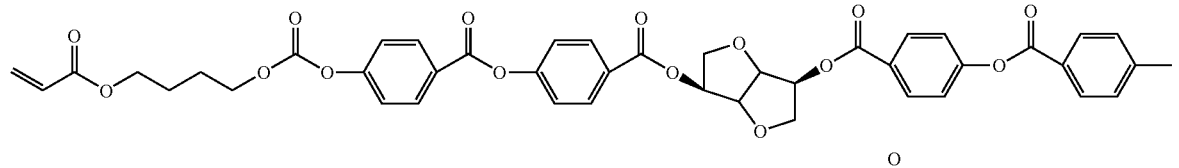

-continued
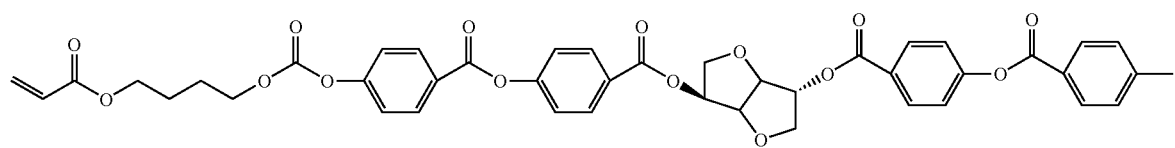
(38)
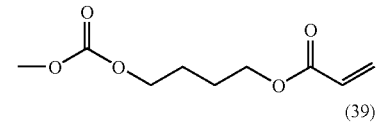
(39)
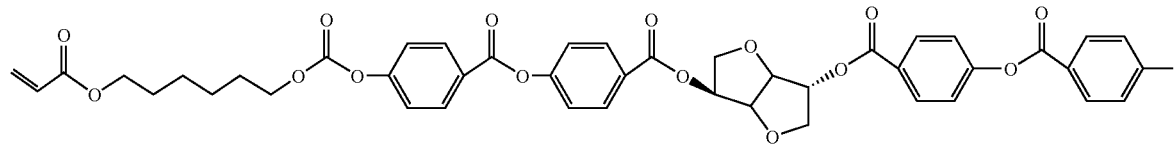
(40)
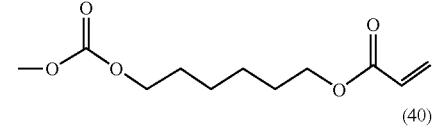
(41)
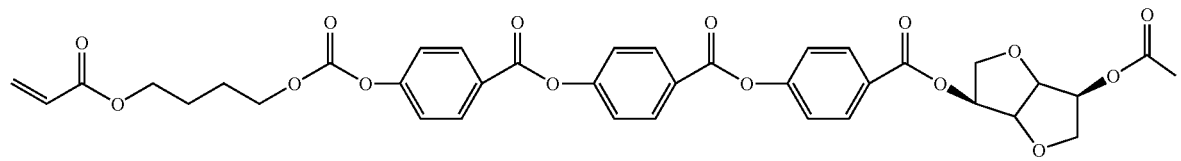
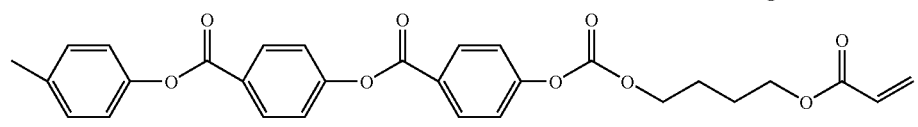
(42)
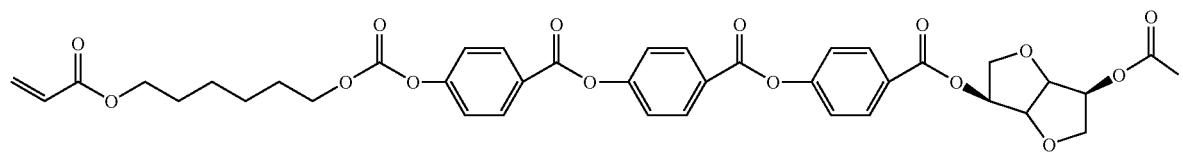
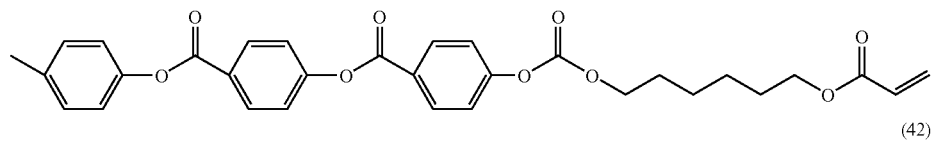
(43)
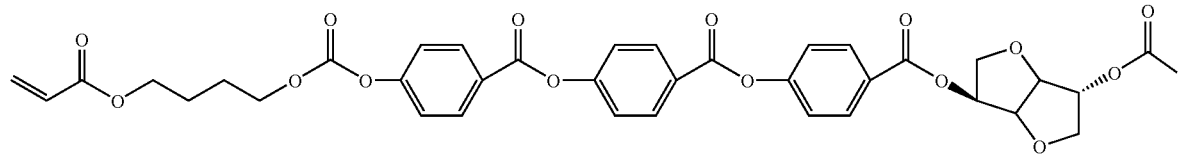
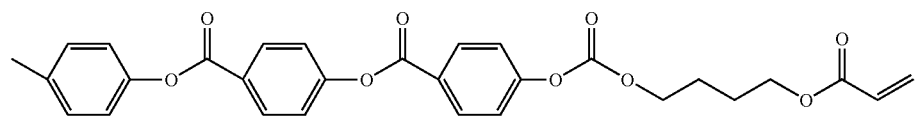
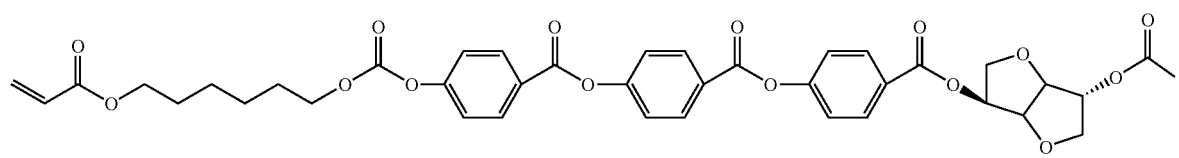

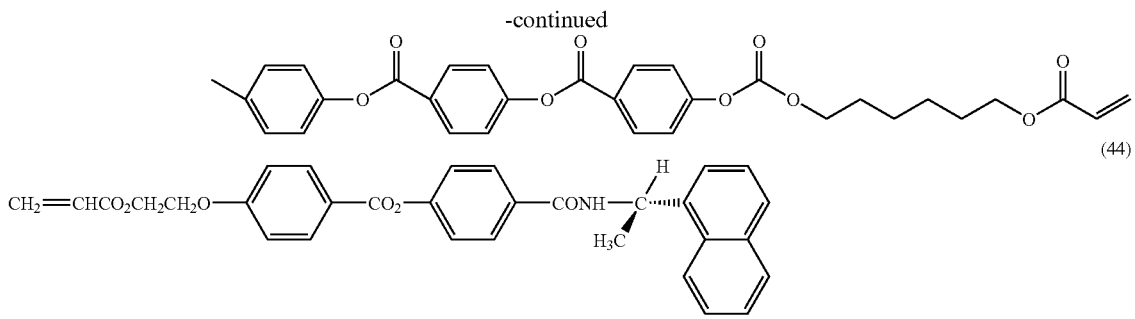

Other than the above-described chiral compounds, chiral compounds mentioned in, for example, DE-A-4342280, and German patent applications No. 19520660.6 and No. 19520704.1 can be used preferably.

The polymerizing agent and the cross-linking agent are not particularly limited but can be agents below, for example. As the polymerizing agent, benzoyl peroxide (BPO), azobisisobutyronitrile (AIBN) or the like can be used, for example. As the cross-linking agent, an isocyanate-based cross-linking agent, an epoxy-based cross-linking agent, a metal chelate cross-linking agent or the like can be used, for example. These agents may be used alone or in combination of two or more.

The coating solution can be prepared by, for example, dissolving or dispersing the liquid crystal monomer or the like in a suitable solvent. The solvent is not particularly limited but can be, for example, halogenated hydrocarbons such as chloroform, dichloromethane, carbon tetrachloride, dichloroethane, tetrachloroethane, methylene chloride, trichloroethylene, tetrachloroethylene, chlorobenzene and orthodichlorobenzene; phenols such as phenol, p-chlorophenol, o-chlorophenol, m-cresol, o-cresol and p-cresol; aromatic hydrocarbons such as benzene, toluene, xylene, methoxybenzene and 1,2-dimethoxybenzene; ketone-based solvents such as acetone, methyl ethyl ketone (MEK), methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether, tetrahydrofuran and dioxane; or carbon disulfide, ethyl cellosolve or butyl cellosolve. In particular, toluene, xylene, mesitylene, MEK, methyl isobutyl ketone, cyclohexanone, ethyl cellosolve, butyl cellosolve, ethyl acetate, butyl acetate, propyl acetate and ethyl cellosolve acetate are preferable. These solvents may be used alone or as a mixture of two or more, for example.

The ratio of the chiral dopant to be added is determined suitably according to a desired helical pitch or a desired selective reflection wavelength range, for example. The added ratio with respect to the liquid crystal monomer ranges from 5 wt % to 23 wt % and preferably ranges from 10 wt % to 20 wt %. As described above, by controlling the added ratio of the chiral dopant to the liquid crystal monomer in this manner, the selective wavelength range of an optical film to be formed can be set to the above-mentioned range. When the ratio of the chiral dopant to the liquid crystal monomer is equal to or larger than 5 wt %, it becomes much easier to control the selective reflection wavelength range of an optical film to be formed to a shorter wavelength side, for example. On the other hand, when this ratio is equal to or smaller than 23 wt %, the temperature range in which the liquid crystal monomer is aligned in a cholesteric manner, that is, the temperature range in which the liquid crystal monomer is in a liquid crystalline phase expands, so that the temperature in an aligning process, which will be described later, does not have to be controlled precisely, making the manufacturing very easy.

For example, when chiral dopants with equal helical twisting powers are used, the selective reflection wavelength range to be formed is shifted further to the shorter wavelength side with an increase in the added ratio of the chiral dopant with respect to the liquid crystal monomer. Also, when the added ratios of the chiral dopants with respect to the liquid crystal monomer are equal, the selective reflection wavelength range of an optical film to be formed is shifted further to the shorter wavelength side with an increase in the helical twisting power of the chiral dopants. As a specific example, in the case where the selective reflection wavelength range of the optical film to be formed is set to range from 200 to 220 nm, it is appropriate that the chiral dopant having a helical twisting power of $5 \times 10^{-4}$ $nm^{-1} \cdot (wt \%)^{-1}$ be blended to be 11 wt % to 13 wt % with respect to the liquid crystal monomer, for example. In the case where the selective reflection wavelength range is set to range from 290 to 310 nm, it is appropriate that the chiral dopant having a helical twisting power of $5 \times 10^{-4}$ $nm^{-1} \cdot (wt \%)^{-1}$ be blended to be 7 wt % to 9 wt % with respect to the liquid crystal monomer, for example.

The combination of the liquid crystal monomer and the chiral dopant is not particularly limited but specifically can be a combination of a monomer agent of the formula (10) above and the chiral dopant of the formula (38) above, that of a monomer agent of the formula (11) above and the chiral dopant of the formula (39) above, or the like.

Further, the added ratio of the cross-linking agent or the polymerizing agent to the liquid crystal monomer ranges, for example, from 0.1 wt % to 10 wt %, preferably from 0.5 wt % to 8 wt % and more preferably from 1 wt % to 5 wt %. When the ratio of the cross-linking agent or the polymerizing agent to the liquid crystal monomer is equal to or larger than 0.1 wt %, it becomes sufficiently easy to cure the cholesteric layer, for example. When this ratio is equal to or smaller than 10 wt %, the temperature range in which the liquid crystal monomer is aligned in a cholesteric manner, that is, the temperature in which the liquid crystal monomer is in a liquid crystalline phase is sufficient, for example, so that the temperature can be controlled still more easily in the aligning process, which will be described later.

Moreover, for example, various additives may be blended suitably into the coating solution as necessary. Examples of such additives include an antioxidant, a denaturant, a surfactant, a dye, a pigment, a discoloration preventing agent, a UV absorber and the like. These additives may be used alone or in combination of two or more, for example. More specifically, conventionally known materials, for example, phenolic compounds, amine compounds, organic sulfur compounds or phosphinic compounds can be used as the antioxidant, and conventionally known materials, for example, glycols, silicones or alcohols can be used as the denaturant, for example. Furthermore, the surfactant is added, for example, for smoothing the surface of the optical compensation layer and can be, for example, a silicone surfactant, an acrylic surfactant, a fluorochemical surfactant or the like. In particular, a silicone surfactant is preferable.

When the liquid crystal monomer is used as above, the prepared coating solution has a viscosity with an excellent workability in application and expansion, for example. The viscosity of the coating solution usually varies depending on the concentration and temperature of the liquid crystal monomer. When the monomer concentration in the coating solution is in the above-noted range of 5 wt % to 70 wt %, the viscosity ranges, for example, from 0.2 to 20 mPa·s, preferably from 0.5 to 15 mPa·s and particularly preferably from 1 to 10 mPa·s. More specifically, when the monomer concentration of the coating solution is 30 wt %, the viscosity ranges, for example, from 2 to 5 mPa·s and preferably from 3 to 4 mPa·s. The coating solution viscosity of equal to or larger than 0.2 mPa·s further prevents the coating solution from flowing undesirably during application, for example, whereas the viscosity of equal to or smaller than 20 mPa·s achieves a still better surface smoothness, further prevents thickness unevenness and allows easy application. Incidentally, although the temperature range from 20° C. to 30° C. has been illustrated for the viscosity described above, there is no particular limitation to this temperature.

Next, the coating solution is applied onto the alignment substrate, thus forming the expanded layer.

It is appropriate that the coating solution be flow-expanded by a conventionally known method such as roller coating, spin coating, wire bar coating, dip coating, extrusion method, curtain coating or spray coating. Among these methods, spin coating and extrusion coating are preferable considering the application efficiency.

The alignment substrate is not particularly limited as long as it can align the liquid crystal monomer. For example, a substrate obtained by rubbing the surface of a plastic film or a plastic sheet of various kinds with a rayon cloth or the like can be used. The above-mentioned plastics is not particularly limited and can be, for example, triacetylcellulose (TAC), polyolefin such as polyethylene, polypropylene or poly(4-methyl pentene-1), polyimide, polyimide amide, polyetherimide, polyamide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose-based plastics, an epoxy resin, a phenolic resin, polynorbornene, polyester, polystyrene, polyvinyl chloride, polyvinylidene chloride, liquid crystal polymers or the like. Alternatively, the alignment substrate can be obtained by providing the above-mentioned plastic film or sheet on the surface of a substrate made of metal such as aluminum, copper or steel, a ceramic substrate or a glass substrate or by forming an obliquely deposited film of $SiO_2$ on that surface. Also, it may be possible to use as the alignment substrate a laminate of the above-mentioned plastic film or sheet and a birefringent stretched film that has been subjected to a stretching treatment such as uniaxial stretching to serve as an alignment layer. Furthermore, it is preferable that the substrate itself is birefringent because the rubbing treatment and the lamination of the birefringent film on the surface described above are not necessary. The substrate itself can be made birefringent as above by, for example, casting and extrusion forming other than the stretching treatment during the formation of the substrate.

Subsequently, the expanded layer is subjected to a heating treatment, thereby aligning the liquid crystal monomer in a liquid crystalline state. Since the expanded layer contains the chiral dopant as well as the liquid crystal monomer, the liquid crystal monomer that is now in the liquid crystalline phase (the liquid crystalline state) is aligned while being given a twist by the chiral dopant. In other words, the liquid crystal monomer shows a cholesteric structure (a helical structure).

The temperature condition in the heating treatment can be determined suitably according to, for example, kinds of the liquid crystal monomer, more specifically, the temperature at which the liquid crystal monomer shows a liquid crystalline property. Usually, the temperature ranges from 40° C. to 120° C., preferably from 50° C. to 100° C. and more preferably from 60° C. to 90° C. A temperature equal to or higher than 40° C. usually makes it possible to align the liquid crystal monomer sufficiently, whereas a temperature equal to or lower than 120° C. allows a wide range of selectable alignment bases of various kinds as described above, taking into account heat resistance, for example.

Next, the expanded layer in which the liquid crystal monomer is aligned is subjected to a cross-linking treatment or a polymerization treatment, thereby polymerizing or cross-linking the liquid crystal monomer and the chiral dopant. In this manner, the liquid crystal monomer is polymerized or cross-linked within itself or with the chiral dopant while maintaining the alignment with the cholesteric structure, so that the alignment is fixed. Thus formed polymer is a non-liquid crystal polymer because the alignment has been fixed.

The polymerization treatment or the cross-linking treatment can be determined suitably depending on, for example, kinds of a polymerizing agent or a cross-linking agent to be used. For example, light irradiation is appropriate in the case of using a photopolymerizing agent or a photocross-linking agent, and ultraviolet irradiation is appropriate in the case of using an ultraviolet polymerizing agent or an ultraviolet cross-linking agent.

In this way, it is possible to provide, on the alignment substrate, an optical compensation layer formed of the non-liquid crystal polymer that is aligned while having a cholesteric structure. This optical compensation layer shows a non-liquid crystalline property because its alignment is fixed as described above. Therefore, it does not transform, for example, between a liquid crystalline phase, a glassy phase and a crystalline phase according to changes in temperature, so that its alignment does not change with temperature. Consequently, it serves as a high-performance retardation film that is not affected by temperature change and can be used as an optical compensation plate of the present invention. Furthermore, if the selective reflection wavelength range is controlled to the above-noted range, light leakage and the like as described above can be also suppressed.

Moreover, the optical compensation layer may be peeled off from the alignment substrate, and at least one surface may be provided with an anti-cracking layer. Alternatively, the optical compensation layer can be kept laminated on the alignment substrate, and the surface of the optical compensation layer may be provided with an anti-cracking layer.

In the optical compensation layer in the present invention, not only the non-liquid crystal polymer described above but also a liquid crystal polymer may serve as constituent molecules. In this case, a cholesteric layer in which the liquid crystal polymer serve as constituent molecules can be formed by, for example, the above-described producing method including forming an expanded layer by expanding onto an alignment base a coating solution that contains a liquid crystal polymer and the chiral dopant, and subjecting the expanded layer to a heating treatment so that the liquid crystal polymer is aligned while having a cholesteric structure.

The polarizing plate with the optical compensation layer according to the present invention as described above can be produced by, for example, applying a pressure-sensitive adhesive (A) and a pressure-sensitive adhesive (B) on respective surfaces of the optical compensation layer so as to form a pressure-sensitive adhesive layer (A) and a pressure-sensitive adhesive layer (B), and making the optical compensation layer and the polarizing plate adhere to each other with the pressure-sensitive adhesive layer (A).

First, the pressure-sensitive adhesive (A) is applied on one surface of the optical compensation layer and dried, thereby forming the pressure-sensitive adhesive layer (A), whereas the pressure-sensitive adhesive (B) is applied on the other surface of the optical compensation layer, thereby forming the pressure-sensitive adhesive layer (B).

The above-described pressure-sensitive adhesive can be prepared as a polymer solution by dissolving or dispersing the above-mentioned polymer materials into a solvent. The content ratio of the above-mentioned polymer in this solution ranges, for example, from 10 to 80 wt % (solids), preferably from 20 to 60 wt % and more preferably 30 to 50 wt %. More specifically, in the case where the polymer is an acrylic polymer, it ranges, for example, from 20 to 80 wt % (solids), preferably from 25 to 65 wt % and more preferably 30 to 50 wt %.

The kinds of the solvent can be determined suitably depending on kinds of the polymer, for example, and be ethyl acetate, methyl ethyl ketone, methyl isobutyl ketone, toluene or xylene. Further, as necessary, it may be possible to use a mixture of two or more of these solvents.

The above-noted polymer solution may contain not only various polymers such as the acrylic polymer mentioned above but also polyfunctional compounds as described above or various additives, for example. The adhesiveness of the pressure-sensitive adhesive can be determined suitably depending on the kind of a monomer, which is a material for forming the polymer, the polymerization ratio and polymerization degree, and the kind and amount of the polyfunctional compound or various additives, for example.

The amount of the pressure-sensitive adhesive applied to the optical compensation layer is not particularly limited. However, when the polymer solution described above is applied, it ranges, for example, from 0.3 to 3 ml, preferably from 0.5 to 2 ml and particularly preferably from 1 to 2 ml per area ($cm^2$) of the optical compensation layer.

Then, it is appropriate that the surface of this optical compensation layer be laminated with the polarizing plate via the formed pressure-sensitive adhesive layer (A). Furthermore, a release film may be arranged on the other surface, i.e., the surface of the pressure-sensitive adhesive layer (B) as described above. In this manner, the polarizing plate with the optical compensation layer according to the present invention is produced. When putting this polarizing plate with the optical compensation layer into use, it is appropriate to peel off the release film and mount this polarizing plate on various image display apparatuses via the pressure-sensitive adhesive layer (B).

Incidentally, the surfaces of the optical compensation layer and the polarizing plate can be subjected to conventionally known various surface treatments for improving the adhesiveness to the pressure-sensitive adhesive layers (A) and (B), as long as they satisfy the adhesiveness described above.

There is no particular limitation on the size of the polarizing plate with an optical compensation layer according to the present invention. For example, after the release film is removed, the thickness preferably is 150 to 300 μm, more preferably is 170 to 280 μm and particularly preferably is 200 to 250 μm. Although the thickness of the pressure-sensitive adhesive layers (A) and (B) described above is not particularly limited, the pressure-sensitive adhesive layer (A) has a thickness ranging, for example, from 5 to 100 μm and the pressure-sensitive adhesive layer (B) has a thickness of, for example, 10 to 50 μm.

The optical compensation layer and the polarizing plate of the present invention may be treated with an UV absorber such as salicylate ester compounds, benzophenone compounds, benzotriazole compounds, cyanoacrylate compounds or nickel complex salt-based compounds, thus providing an UV absorbing capability.

FIG. 1 is a sectional view showing an exemplary polarizing plate with an optical compensation layer according to the present invention. The polarizing plate with an optical compensation layer (1) shown in FIG. 1 includes an optical compensation layer (12) whose both surfaces are laminated with a pressure-sensitive adhesive layer (A) (11A) and a pressure-sensitive adhesive layer (B) (11B), and further a polarizing plate (10) provided via the pressure-sensitive adhesive layer (A) (11A). On the other surface of the pressure-sensitive adhesive layer (B) (11B), a release film (13) is arranged until the polarizing plate with the optical compensation layer is put to use.

The polarizing plate with the optical compensation layer according to the present invention can be used in various display apparatuses such as a liquid crystal display as described above. The liquid crystal display can be formed by a conventionally know method. That is, the liquid crystal display generally is formed by assembling suitably constituent parts including optical elements such as a liquid crystal cell and a polarizing plate and, as necessary, an illuminating system, and incorporating a driving circuit. There is no particular limitation on the liquid crystal display in the present invention as long as the polarizing plate with the optical compensation layer according to the present invention is used. The liquid crystal cell can be a cell of any type, for example, a TN type, an STN type or a π type.

More specifically, it is possible to provide a liquid crystal panel or a liquid crystal display, in which the polarizing plate with the optical compensation layer according to the present invention is arranged on one side or both sides of a liquid crystal cell. In particular, when the polarizing plate with the optical compensation layer according to the present invention has the release film as described above, it can be disposed by peeling off the release film and attaching the exposed pressure-sensitive adhesive layer (B) to the liquid crystal cell. When disposing the polarizing plate with the optical compensation layer in the liquid crystal cell, in the case where the retardation plate and the polarizing plate are arranged on both sides of the liquid crystal cell, they can be the same or different.

Moreover, for forming a liquid crystal display, one layer or two or more layers of suitable parts such as a diffusion plate, an anti-glare layer, an antireflection layer, a protective plate, a prism array sheet, a lens array sheet, an optical diffuser, a backlight, a reflective plate, a transreflector and a brightness enhancement plate can be arranged at suitable positions.

The polarizing plate with the optical compensation layer according to the present invention is not limited to the above-described structure, but may also have various optical members such as a retardation film, a liquid crystal film, a light-diffusion film, a diffraction film having other refractive index structure. In particular, a reflective polarizing plate laminated with a reflective plate, a reflective polarizing plate laminated with a transreflector, and further a polarizing plate laminated with a brightness enhancement film may be used.

In general, such a reflective polarizing plate is used in a liquid crystal display or the like to reflect incident light from a visible side (display side) and display an image. The reflective polarizing plate has some merits, for example, assembling of light sources such as backlight can be omitted, and the liquid crystal display can be made thinner. The reflective polarizing plate can be formed by providing a reflecting layer of metal or the like on one surface of the polarizing plate in the polarizing plate with the optical compensation layer via a transparent protective layer as necessary.

The reflecting layer in the reflective polarizing plate can be arranged on the side of the transparent protective film in the polarizing plate, for example. More specifically, on one surface of a protective film that has been matted if required, a foil comprising a reflective metal such as aluminum or a deposition film is applied to form a reflecting layer. An additional example of a reflective polarizing plate comprises the above-mentioned protective film having a surface of a microscopic asperity due to contained fine particles, and also a reflecting layer corresponding to the microscopic asperity. The reflecting layer having a microscopic asperity surface diffuses incident light by irregular reflection so that directivity and glare can be prevented and irregularity in color tones can be controlled. Also, the protective film containing fine particles has an advantage in that incident light and its reflected light are diffused when passing through this film, so that irregularity in color tones can be controlled further. The reflecting layer with a microscopic asperity structure corresponding to the microscopic asperity of the protective film can be formed by disposing a metal layer directly on a surface of the transparent protective layer in any suitable methods including deposition such as vacuum deposition, and plating such as ion plating and sputtering.

Alternatively, the reflector can be used as a reflecting sheet formed by providing a reflecting layer onto a suitable film similar to the transparent film. Since the reflecting layer typically is formed of a metal, it is more preferable that the reflecting surface of the reflecting layer is coated with a protective film, a polarizing plate or the like in order to prevent the reflection rate from lowering due to oxidation. As a result, the initial reflection rate is maintained for a long period, and a separate protective layer can be omitted.

The above-mentioned semi-transmission polarizing plate is obtained by using a semi-transmission reflecting layer, and it is exemplified by a half mirror that reflects and transmits light as described above. In general, such a semi-transmission polarizing plate is arranged on a backside of a liquid crystal cell. In a liquid crystal display comprising the semi-transmission polarizing plate, incident light from the visible side (display side) is reflected to display an image when the liquid crystal display is used in a relatively bright atmosphere, while in a relatively dark atmosphere, an image is displayed by using a built-in light source such as a backlight. In other words, the semi-transmission polarizing plate can be used to form a liquid crystal display that can save energy for a light source such as a backlight under a bright atmosphere, while a built-in light source can be used under a relatively dark atmosphere.

Generally, the polarizing plate obtained by attaching a polarizing plate and a brightness enhancement film to each other as described above is arranged on a backside of a liquid crystal cell. When natural light enters, by reflection from a backlight or a backside of a liquid crystal display etc., the brightness enhancement film reflects linearly polarized light of a predetermined polarizing axis or circularly polarized light in a predetermined direction while the same film transmits other light. This polarizing plate formed of the laminate of the brightness enhancement film and the polarizing plate allows entrance of light from a light source such as a backlight so as to obtain transmitted light in a predetermined polarization state, while reflecting light other than light in the predetermined polarization state. Then, light that is reflected at this brightness enhancement film is reversed through a reflecting layer or the like arranged additionally behind the brightness enhancement film. The reversed light that re-enters the brightness enhancement film is transmitted partly or entirely as light in a predetermined polarization state, so that light transmitting the brightness enhancement film is increased. With the increase in light, polarized light that is hard to be absorbed in the polarizer is supplied. As a result, quantity of light available for the liquid crystal display etc. can be increased to enhance brightness. In other words, when light enters through a polarizer from the backside of a liquid crystal cell by using a backlight or the like without using any brightness enhancement films, most light is absorbed in the polarizer but not transmitted by the polarizer if the light has a polarization direction inconsistent with the polarization axis of the polarizer. Depending on characteristics of the polarizer, about 50% of light is absorbed in the polarizer, and this decreases quantity of light available in the liquid crystal display or the like and makes the image dark. The brightness enhancement film repeatedly prevents light having a polarization direction to be absorbed in the polarizer from entering the polarizer, and reflects the light on the brightness enhancement film, reverses the light through a reflecting layer or the like arranged behind, and makes the light re-enter the brightness enhancement plate. The brightness enhancement film transmits the polarized light that is reflected and reversed between them only if the light has a polarization direction to pass the polarizer, and supplies to the polarizer. Thus, light from a backlight or the like can be used efficiently for displaying images of a liquid crystal display in order to provide a bright screen.

A diffusion plate can also be provided between the brightness enhancement film and the reflecting layer or the like. Light reflected by the brightness enhancement film is directed to the reflecting layer or the like. The diffusion plate diffuses the passing light uniformly and at the same time, it cancels the polarization of light so as to provide a depolarized state. Namely, the diffusion plate converts the polarized light back into its original state as natural light. This depolarized light, i.e., natural light is directed to the reflecting layer or the like, reflected at the reflecting layer or the like, and it passes again the diffusion plate so as to re-enter the brightness enhancement film. In this manner, the diffusion plate for converting the polarized light back to its original state as natural light is provided between the brightness enhancement film and the reflecting layer or the like, thereby maintaining brightness of the display screen and decreasing irregularity in the brightness, so that a screen having uniform brightness can be obtained. By providing such a diffusion plate, since the diffusion plate has a diffusion function and further it can increase appropriately the repeated reflection of the initial incident light, it is considered that a display screen having uniform brightness can be obtained.

The brightness enhancement film can be, for example, a multilayer thin film of a dielectric or a multilayer laminate of thin films with varied refraction anisotropy that transmits linearly polarized light having a predetermined polarization axis while reflecting other light, or an aligned film of a cholesteric liquid crystal polymer or an aligned liquid crystal layer fixed onto a supportive substrate that reflects either clockwise or counterclockwise circularly polarized light while transmitting other light.

Therefore, a brightness enhancement film to transmit linearly polarized light having a predetermined polarization axis described above allows the transmission light to enter the polarizing plate by matching the polarization axis, so that absorption loss due to the polarizing plate is controlled and the light can be transmitted efficiently. For a brightness enhancement film to transmit circularly polarized light, i.e., a cholesteric liquid crystal layer, preferably, the circularly polarized light is converted to linearly polarized light via a retardation plate before entering the polarizing plate in an aspect of controlling of the absorption loss, though the circularly polarized light can enter the polarizing plate directly. Circularly polarized light can be converted to linearly polarized light by using a quarter wavelength plate for the retardation plate.

A retardation plate having a function as a quarter wavelength plate in a wide wavelength range including a visible light region can be obtained, for example, by overlapping a retardation layer functioning as a quarter wavelength plate for monochromatic light such as light having 550 nm wavelength and another retardation layer showing a separate optical retardation property (e.g., a retardation plate functioning as a half wavelength plate). Therefore, a retardation plate arranged between a polarizing plate and a brightness enhancement film can comprise a single layer or at least two layers of retardation layers.

A cholesteric liquid crystal layer also can be provided by combining and overlapping two or more layers different in the reflection wavelength. As a result, the obtained retardation plate can reflect circularly polarized light in a wide wavelength range including a visible light region, and this can provide transmission circularly polarized light in a wide wavelength range.

As the polarization separation polarizing plate described above, a polarizing plate may be formed by laminating the polarizing plate and two or more optical layers. Thus, the polarizing plate may be a reflective polarizing plate or a semi-transmission polarizing plate for elliptically polarized light, which is prepared by combining either the above-mentioned reflective polarizing plate or a semi-transmission polarizing plate with a retardation plate.

The polarizing plate with an optical compensation layer according to the present invention can be used not only in the above-described liquid crystal display but also in various self-light-emitting displays, for example, an EL apparatus, a plasma display, an FED display or the like. Also, the application method thereof is not particularly limited as long as the polarizing plate with the optical compensation layer according to the present invention is used instead of a conventional polarizing plate.

Now, an organic EL display apparatus will be described. In general, an organic EL display apparatus has a luminant (organic electroluminescence luminant) that is prepared by laminating a transparent electrode, an organic luminant layer and a metal electrode in a certain order on a transparent substrate. Here, the organic luminant layer is a laminate of various organic thin films. Known examples of the combination thereof include a laminate of a hole injection layer made of a triphenylamine derivative or the like and a luminant layer made of a phosphorous organic solid such as anthracene; a laminate of the luminant layer and an electron injection layer made of a perylene derivative or the like; or a laminate of the hole injection layer, the luminant layer and the electron injection layer.

In general, the organic EL display apparatus emits light on the following principle: a voltage is applied to the transparent electrode and the metal electrode so as to inject holes and electrons into the organic luminant layer, energy generated by the re-bonding of these holes and electrons excites the phosphor, and the excited phosphor emits light when it returns to the basis state. The mechanism of the re-bonding during the process is similar to that of an ordinary diode. This implies that current and the light emitting intensity exhibit a considerable nonlinearity accompanied with a rectification with respect to the applied voltage.

In the organic EL apparatus, it is necessary that at least one of the electrodes is transparent so as to obtain luminescence at the organic luminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag and Al—Li are used.

In an organic EL display apparatus configured as described above, the organic luminant layer is made of a film that is extremely thin such as about 10 nm. Therefore, the organic luminant layer transmits substantially as much light as the transparent electrode does. As a result, when the layer does not illuminate, a light beam entering from the surface of the transparent substrate and passing through the transparent electrode and the organic luminant layer before being reflected at the metal electrode comes out again to the surface of the transparent substrate. Thereby, the display surface of the organic EL display apparatus looks like a mirror when viewed from the outside.

A transparent electrode can be provided on the surface of the organic luminant layer that emits light by application of voltage. At the same time, in an organic EL display apparatus including an organic EL luminant having a metal electrode on the back surface of the organic luminant layer, for example, a polarizing plate can be provided on the surface of the transparent electrode and a retardation plate can be provided between the transparent electrode and the polarizing plate.

The retardation plate and the polarizing plate function to polarize light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization directions of the retardation plate and the polarizing plate to be π/4.

That is, the polarizing plate transmits only the linearly polarized light component among the external light entering the organic EL display apparatus. In general, the linearly polarized light is changed into elliptically polarized light by the retardation plate. When the retardation plate is a quarter wavelength plate and when the angle of the polarization directions of the polarizing plate and the retardation plate is π/4, the light is changed into circularly polarized light.

This circularly polarized light passes through the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. As a result, the mirror of the metal electrode can be blocked completely.

EXAMPLES

The following is a further description of the present invention, with reference to Examples and Comparative examples. It should be noted that the present invention is not limited to these Examples alone.

Example 1

On a 50 μm thick triacetylcellulose (TAC) film (manufactured by Fuji Photo Film Co., Ltd.; trade name:T-50SH), 1 wt % PVA (manufactured by The Nippon Synthetic Chemical Industry Co., Ltd.; trade name: NH-18) aqueous solution was applied and dried at 90° C., thus forming a PVA coating having a thickness of equal to or smaller than about 0.01 μm. Then, a surface of this coating was rubbed so as to form an alignment film. On the other hand, a liquid crystal monomer represented by the formula (6) above (a polymerized rod-like nematic liquid crystal) and a chiral dopant represented by the formula (44) above were mixed such that the weight ratio between them were 7:3. This mixture was dissolved in toluene so as to obtain 40 wt % solution. Furthermore, a photopolymerization initiator (trade name: IRGACURE; manufactured by Ciba Specialty Chemicals) was added so as to account for 3 wt %, thereby preparing a coating solution. The coating solution was applied to the alignment film and subjected to a heat treatment at 90° C. for 1 minute, thereby aligning the liquid crystal monomer. Thereafter, a UV irradiation was carried out to polymerize the liquid crystal monomer so that its alignment was fixed. Then, the TAC film and the PVA coating were removed, thus obtaining an optical compensation layer having a thickness of 5 μm. This optical compensation layer had an in-plane retardation of 1 nm, a retardation in a thickness direction of 200 nm and a helical pitch observed with a TEM photograph (cross-sectional view) of 0.08 μm.

A pressure-sensitive adhesive (A) described below was applied onto one surface of this optical compensation layer so as to form a pressure-sensitive adhesive layer (A) (having a thickness of 10 μm), and a polarizing plate (trade name: HEG5425DU; manufactured by Nitto Denko Corporation) was made to adhere to the optical compensation layer via the pressure-sensitive adhesive layer (A). On the other hand, a pressure-sensitive adhesive (B) described below was applied to a release film (trade name: RT-38G; manufactured by Nitto Denko Corporation) so as to form a pressure-sensitive adhesive layer (B) (having a thickness of 20 μm), and the release film was attached by roller such that the pressure-sensitive adhesive layer (B) and the other surface of the optical compensation layer faced each other. In this manner, a polarizing plate with an optical compensation layer according to the present invention in which the release film was arranged on the surface of the pressure-sensitive adhesive layer (B) was obtained.

The pressure-sensitive adhesive (A) was a pressure-sensitive adhesive solution (15 wt % toluene solution) prepared by adding 0.5 parts by weight of a cross-linking agent (polyfunctional isocyanate compound; manufactured by NIPPON POLYURETHANE INDUSTRY CO., LTD.) to 100 parts by weight (solids) of an acrylic polymer. The acrylic polymer had a weight ratio of butylacrylate/acrylic acid=100/5, a weight-average molecular weight of 1,500,000 and a glass transition temperature of −30° C.

The in-plane retardation and the retardation value in the thickness direction of the optical compensation layer were measured at a wavelength of 590 nm using an automatic birefringence analyzer (trade name:KOBRA; manufactured by Oji Scientific Instruments).

In-plane retardation=$(nx-ny) \times d$

Retardation in a thickness direction=$[\{(nx+ny)/2\}-nz] \times d$

The above-noted nx, ny and nz respectively indicate refractive indices in an X-axis direction, a Y-axis direction and a Z-axis direction of the optical compensation layer. The X-axis direction is an axial direction exhibiting a maximum refractive index within the surface of the optical compensation layer, the Y-axis direction is an axial direction perpendicular to the X axis direction within the surface, and the Z-axis direction is a thickness direction perpendicular to the X axis and the Y axis. Further, d indicates the thickness of the optical compensation layer.

The pressure-sensitive adhesive (B) was a pressure-sensitive adhesive solution (15 wt % toluene solution) prepared by adding 1 part by weight of a cross-linking agent (polyfunctional isocyanate compound; manufactured by NIPPON POLYURETHANE INDUSTRY CO., LTD.) to 100 parts by weight (solids) of an acrylic polymer. The acrylic polymer had a weight ratio of 2-ethylhexyl acrylate/acrylic acid=100/5, a weight-average molecular weight of 1,000,000 and a glass transition temperature of −40° C.

Example 2

A polarizing plate with an optical compensation layer was obtained similarly to Example 1 above except for using as the pressure-sensitive adhesive (B) a pressure-sensitive adhesive solution (15 wt % toluene solution) prepared by adding 0.8 parts by weight of a cross-linking agent (polyfunctional isocyanate compound; manufactured by NIPPON POLYURETHANE INDUSTRY CO., LTD.) to 100 parts by weight (solids) of an acrylic polymer. The acrylic polymer had a weight ratio of butylacrylate/acrylic acid=100/3, a weight-average molecular weight of 1,500,000 and a glass transition temperature of −33° C.

Comparative Example 1

A polarizing plate with an optical compensation layer was obtained similarly to Example 1 above except for using as the pressure-sensitive adhesive (B) a pressure-sensitive adhesive solution (15 wt % toluene solution) prepared by adding 0.5 parts by weight of a cross-linking agent (polyfunctional isocyanate compound; manufactured by NIPPON POLYURETHANE INDUSTRY CO., LTD.) to 100 parts by weight (solids) of an acrylic polymer. The acrylic polymer had a weight ratio of butylacrylate/2-hydroxyacrylate=100/5, a weight-average molecular weight of 1,000,000 and a glass transition temperature of $-33°$ C.

Comparative Example 2

A polarizing plate with an optical compensation layer was obtained similarly to Example 1 above except for using as the pressure-sensitive adhesive (A) a pressure-sensitive adhesive solution (15 wt % toluene solution) prepared by adding 0.5 parts by weight of a cross-linking agent (polyfunctional isocyanate compound; manufactured by NIPPON POLYURETHANE INDUSTRY CO., LTD.) to 100 parts by weight (solids) of an acrylic polymer and using as the pressure-sensitive adhesive (B) a pressure-sensitive adhesive solution (10 wt % toluene solution) prepared by adding 0.5 parts by weight of a cross-linking agent (polyfunctional isocyanate compound; manufactured by NIPPON POLYURETHANE INDUSTRY CO., LTD.) to 100 parts by weight (solids) of an acrylic polymer. The acrylic polymer for the pressure-sensitive adhesive (A) had a weight ratio of isononyl acrylate/acrylic acid=100/1, a weight-average molecular weight of 700,000 and a glass transition temperature of $-55°$ C. The acrylic polymer for the pressure-sensitive adhesive (B) had a weight ratio of butylacrylate/methylacrylate/acrylic acid=100/100/1, a weight-average molecular weight of 1,000,000 and a glass transition temperature of $-9°$ C.

Comparative Example 3

A polarizing plate with an optical compensation layer was obtained similarly to Example 1 above except for using as the pressure-sensitive adhesive (B) a pressure-sensitive adhesive solution (10 wt % toluene solution) prepared by adding 1 part by weight of a cross-linking agent (polyfunctional isocyanate compound; manufactured by NIPPON POLYURETHANE INDUSTRY CO., LTD.) to 100 parts by weight (solids) of an acrylic polymer. The acrylic polymer had a weight ratio of butylacrylate/methylacrylate/2-hydroxyethyl acrylate=100/100/1, a weight-average molecular weight of 800,000 and a glass transition temperature of $-5°$ C.

With respect to the obtained polarizing plates with the optical compensation layer according to Examples and Comparative examples, samples having a length of 100 mm and a width of 25 mm were prepared and evaluated as follows. Incidentally, the length here refers to a length of the polarizing plate in an absorption axis direction, while the width refers to a length thereof in a direction perpendicular to the absorption axis. Table 1 below shows the results.

(Adhesive Strength of Pressure-Sensitive Adhesive Layer (A))

The release film was peeled off from the obtained polarizing plate with the optical compensation layer. Onto the thus exposed pressure-sensitive adhesive layer (B), a $SiO_2$ surface of a $SiO_2$ obliquely-deposited polyethylene terephthalate film with a thickness of 125 µm was attached using a 2 kg roller (run back and forth once in each direction) and allowed to stand at 25° C. for 20 minutes. Thereafter, under a peeling condition of a temperature of 25° C., a peeling speed of 300 mm/min and an angle of 90°, the polarizing plate of the polarizing plate with the optical compensation layer and the polyethylene terephthalate film were peeled off according to JIS Z 0237 using the tensile test machine, thereby measuring the adhesive strength of the pressure-sensitive adhesive layer (A).

(Adhesive Strength of Pressure-Sensitive Adhesive Layer (B))

The release film was peeled off from the obtained polarizing plate with the optical compensation layer. Via the thus exposed pressure-sensitive adhesive layer (B), the polarizing plate with the optical compensation layer was attached to a surface of a glass substrate (1737; manufactured by Corning Incorporated), which had been washed with water and dried. In other words, the above-noted glass substrate was made to adhere to the polarizing plate of the polarizing plate with the optical compensation layer via the pressure-sensitive adhesive layer (B), and at the time of attaching them to each other, a 2 kg roller was run back and forth once in each direction. Then, this laminate was allowed to stand at 25° C. for 20 minutes. Thereafter, under a peeling condition of a temperature of 25° C., a peeling speed of 300 mm/min and an angle of 90°, the polarizing plate with the optical compensation layer and the glass substrate were peeled off from each other according to JIS Z 0237 using the tensile test machine, thereby measuring the adhesive strength of the pressure-sensitive adhesive layer (B).

(Peelability and Remaining Pressure-Sensitive Adhesive)

Using a commercially available vertically-aligned mode liquid crystal panel (MVA; manufactured by FUJITSU LTD.), a glass surface thereof was washed with acetone and air-dried. Thereafter, the glass surface and the polarizing plate with the optical compensation layer from which the release film had been removed were attached to each other via the exposed pressure-sensitive adhesive layer (B). Then, after left standing for 24 hours at room temperature, the polarizing plate with the optical compensation layer was peeled off again so that the external appearance of the surface of the glass substrate was observed visually.

(Adhesion Durability Test)

The polarizing plate with the optical compensation layer (100 mm long and 50 mm wide) from which the release film had been peeled off was attached to a glass substrate (1737; manufactured by Corning Incorporated) by roller via the pressure-sensitive adhesive layer (B). This laminate was treated in an autoclave (at 50° C. at a pressure of 5 atmospheres for 15 minutes) so as to remove air bubbles and allowed to stand at 80° C. for 24 hours (heat resistance). Also, the laminate from which air bubbles had been removed similarly was allowed to stand at 90% RH for 24 hours (moisture resistance). Then, after left standing, the laminate was observed visually for the generation of air bubbles and the occurrence of peeling from the glass substrate and evaluated based on the criteria below.

○: no air bubbles generated and no peeling occurred

X: air bubbles generated and peeling occurred

TABLE 1

|  | Adhesive strength of pressure-sensitive adhesive layer (A) (N/25 mm) | Adhesive strength of pressure-sensitive adhesive layer (B) (N/25 mm) | Peel-ability | Remaining pressure-sensitive adhesive | Durability Heat resistance | Moisture resistance |
|---|---|---|---|---|---|---|
| Ex. 1 | 13.2 | 7.1 | Good | No | ◯ | ◯ |
| Ex. 2 | 13.2 | 7.9 | Good | No | ◯ | ◯ |
| Comp. ex. 1 | 13.2 | 12.4 | X | Yes | ◯ | ◯ |
| Comp. ex. 2 | 5.3 | 13.9 | X | Yes | ◯ | ◯ |
| Comp. ex. 3 | 13.2 | 0.8 | Good | No | X | X |

As becomes clear from Table 1 above, in Examples in which the pressure-sensitive adhesive layer (A) had an adhesive strength exceeding 10 N/25 mm and the pressure-sensitive adhesive layer (B) had an adhesive strength ranging from 1 to 10 N/25 mm, the polarizing plate with the optical compensation layer peeled off from the liquid crystal panel with a good peelability and no pressure-sensitive adhesive remained on the glass surface. Also, even after a heating treatment and a moistening treatment, the samples did not peel off from the glass surface. In contrast, in Comparative examples 1 and 2, which did not satisfy the above-mentioned adhesive strength, the optical compensation layer broke when peeled off from the liquid crystal panel and the pressure-sensitive adhesive remained on the glass surface. Further, in Comparative example 3, although the polarizing plate with the optical compensation layer peeled off without any problem and no pressure-sensitive adhesive remained, there was a problem in adhesiveness in that both of the heating treatment and the moistening treatment caused the peeling from the glass surface.

Examples 3 to 5 and Reference Example

A polarizing plate with an optical compensation layer (300 mm×250 mm) in which the release film was formed on an exposed surface of the pressure-sensitive adhesive layer (B) was produced similarly to Example 1 above except that a commercially available polarizing plate (manufactured by Nitto Denko Corporation; trade name: SEG5224DU) was subjected to a heat treatment at a predetermined temperature for a predetermined period. The heating condition is shown in Table 2 below. Then, the release film was peeled off from the polarizing plate with the optical compensation layer. Via the exposed pressure-sensitive adhesive layer (B), the polarizing plate with the optical compensation layer was attached by roller onto a glass substrate (400 mm×400 mm). Thereafter, an untreated polarizing plate (manufactured by Nitto Denko Corporation; trade name:SEG5224DU) was further attached to the backside of the glass substrate in a crossed Nichols state using a pressure-sensitive adhesive. Using this as a sample, an accelerated test was performed with a drier.

In the accelerated test, the sample was subjected to a heating treatment by allowing it to stand at 80° C. for 100 hours.

Figure 2:
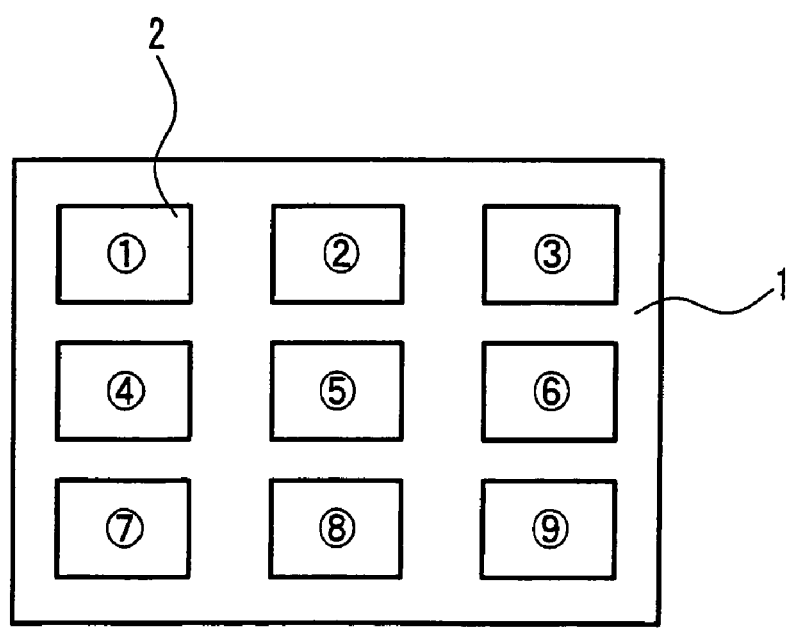
FIG. 2 is a schematic view showing how a polarizing plate is divided into areas for examining irregularities around the perimeter in an example of the present invention.

The sample that had been subjected to the accelerated test was put on a light table in a darkroom for measuring irregularities around the perimeter. The irregularities around the perimeter were observed after dividing a flat surface of the sample into areas ① to ⑨. At the same time, the light transmittance at measuring points in ① to ⑨ on the flat surface of the sample was measured using a luminance meter (BM-5A; manufactured by TOPCON CORPORATION). Thereafter, these measurement values were substituted into the formula (i) below, thereby calculating display irregularities. As the measuring points, nine measuring points (2), i.e., ① to ⑨ were set on the flat surface of the sample (1) as shown in FIG. 2. Table 2 below shows the results of these measurements.

Display irregularities=[(T② +T④ +T⑥ +T⑧ )/4]−[(T① +T③ + T⑤ +T⑦ +T⑨ )/5]     (i)

In the formula (i) above, Tx indicates the light transmittances at measuring points x (① to ⑨). The light transmittance is represented by the formula (ii) below.

Light transmittance=(Brightness of sample after accelerated test/brightness of glass substrate alone)×100     (ii)

As described above, the polarizing plate with the optical compensation layer (300 mm×250 mm) produced similarly to Example 1 above except for subjecting the commercially available polarizing plate (manufactured by Nitto Denko Corporation; trade name: SEG5224DU) to the heat treatment shown in Table 2 below was further subjected to a heating treatment, and then its dimensional change ratio was measured. More specifically, the polarizing plate with the optical compensation layer was further subjected to a heating treatment at 50° C. for 60 minutes as described above. Then, the ratio of dimensional change in the absorption axis direction after the heating treatment was determined. The results thereof are also shown in Table 2 below.

TABLE 2

|  | Example 3 | Example 4 | Example 5 | Reference example |
|---|---|---|---|---|
| Heating treatment | 50° C. × 60 min. | 70° C. × 30 min. | 50° C. × 3 min. | — |
| Irregularities around perimeter (measurement value) | 0.02 | 0.04 | 0.05 | 0.16 |
| Dimensional change ratio (%) | −0.1 | +0.1 | +0.3 | +0.6 |

As described above, the polarizing plate was subjected to a heating treatment in advance, whereby the dimensional change was suppressed even when exposed further to a heating condition and the irregularities around the perimeter were suppressed further. This indicated that it was possible to provide an image display apparatus with excellent display characteristics.

INDUSTRIAL APPLICABILITY

As described above, the polarizing plate with an optical compensation layer according to the present invention achieves an excellent adhesiveness when mounted on an image display apparatus and allows no pressure-sensitive adhesive to remain on a glass substrate of the image display apparatus and makes it easy to reattaching even when peeled off after mounting. Further, an optical compensation layer, which is a constituent member of the polarizing plate with the optical compensation layer, does not break at the time of peeling. Thus, even in the cases where reattaching may become necessary, the polarizing plate with the optical compensation layer of the present invention is very useful for various image display apparatuses.

The invention claimed is:

1. A polarizing plate with an optical compensation layer, comprising:
    an optical compensation layer;
    pressure-sensitive adhesive layers disposed on respective surfaces of the optical compensation layer; and
    a polarizing plate attached via one of the pressure-sensitive adhesive layers;
    wherein each of the pressure-sensitive adhesive layers satisfies the condition below: a pressure-sensitive adhesive layer A causing the optical compensation layer and the polarizing plate to adhere to each other has an adhesive strength exceeding 12 N/25 mm, and when the other pressure-sensitive adhesive layer B is attached to a glass substrate, the pressure-sensitive adhesive layer B causing the optical compensation layer and the glass substrate to adhere to each other has an adhesive strength of 1 to 10 N/25 mm.

2. The polarizing plate with an optical compensation layer according to claim 1, wherein the pressure-sensitive adhesive layers A and B are formed of an acrylic pressure-sensitive adhesive containing an acrylic polymer.

3. The polarizing plate with an optical compensation layer according to claim 2, wherein the acrylic polymer has a glass transition temperature of equal to or lower than 0° C.

4. The polarizing plate with an optical compensation layer according to claim 2, wherein the acrylic polymer in the pressure-sensitive adhesive layer A is a copolymer of butyl acrylate and an acrylic acid and that in the pressure-sensitive adhesive layer B is a copolymer of 2-ethylhexyl acrylate and an acrylic acid.

5. The polarizing plate with an optical compensation layer according to claim 4, wherein a weight ratio a:b between the butyl acrylate a and the acrylic acid b in the copolymer is 100:5 and a weight ratio c:d between the 2-ethylhexyl acrylate c and the acrylic acid d in the copolymer is 100:5.

6. The polarizing plate with an optical compensation layer according to claim 2, wherein the acrylic polymer in the pressure-sensitive adhesive layer A and that in the pressure-sensitive adhesive layer B are each a copolymer of butyl acrylate and an acrylic acid, a weight ratio a:b between the butyl acrylate a and the acrylic acid b of the acrylic polymer in the pressure-sensitive adhesive layer A is 100:5 and a weight ratio a':b' between the butyl acrylate a' and the acrylic acid b' of the acrylic polymer in the pressure-sensitive adhesive layer B is 100:3.

7. The polarizing plate with an optical compensation layer according to claim 1, wherein the polarizing plate is subjected to a heating treatment in advance of attachment via the pressure-sensitive adhesive layer A.

8. The polarizing plate with an optical compensation layer according to claim 7, wherein the polarizing plate that has been subjected to the heating treatment shows a physical property such that a ratio of dimensional change in an absorption axis direction ranges from −0.3% to 0.3% after the polarizing plate that has been subjected to the heating treatment is further treated at 50° C for 60 minutes.

9. The polarizing plate with an optical compensation layer according to claim 1, wherein the optical compensation layer has a thickness ranging from 0.1 to 20 μm.

10. The polarizing plate with an optical compensation layer according to claim 1, wherein the optical compensation layer is a cholesteric layer whose constituent molecules are aligned while having a cholesteric structure.

11. The polarizing plate with an optical compensation layer according to claim 10, wherein the constituent molecules of the cholesteric layer are a liquid crystal monomer, the liquid crystal monomer is aligned while having the cholesteric structure, and the liquid crystal monomer is polymerized or crosslinked.

12. The polarizing plate with an optical compensation layer according to claim 11, wherein the cholesteric layer has a helical pitch of equal to or smaller than 0.25 μm.

13. The polarizing plate with an optical compensation layer according to claim 10, wherein the constituent molecules of the cholesteric layer are a liquid crystal polymer, and the liquid crystal polymer is aligned while having the cholesteric structure.

14. The polarizing plate with an optical compensation layer according to claim 1, wherein the polarizing plate comprises a polarizer and a transparent protective layer, and at least one surface of the polarizer is laminated with the transparent protective layer.

15. The polarizing plate with an optical compensation layer according to claim 1, wherein a surface of the pressure-sensitive adhesive layer B is provided with a release film.

16. A liquid crystal panel comprising:
    a liquid crystal cell; and
    the polarizing plate with an optical compensation layer according to claim 1.

17. A liquid crystal display comprising:
    the liquid crystal panel according to claim 16.

18. An image display apparatus comprising the polarizing plate with an optical compensation layer according to claim 1.

19. The image display apparatus of claim 18, which is an electroluminescence display.

20. The image display apparatus of claim 18, which is a plasma display.

21. The image display apparatus of claim 18, which is a field emission display.

22. The polarizing plate of claim 1, wherein the adhesive strength of pressure-adhesive layer A is equal to or larger than 15 N/25 mm.

23. The polarizing plate of claim 1, wherein the adhesive strength of pressure-adhesive layer A is equal to or larger than 20 N/25 mm.

24. The polarizing plate of claim 1, wherein the adhesive strength of pressure-adhesive layer B is from 1.5 to 9.5 N/25 mm.

25. A polarizing plate with an optical compensation layer, comprising:
- an optical compensation layer;
- pressure-sensitive adhesive layers disposed on respective surfaces of the optical compensation layer; and
- a polarizing plate attached via one of the pressure-sensitive adhesive layers;
- wherein one A of the pressure-sensitive layers causes the optical compensation layer and the polarizing plate to adhere to each other, and the other B of the pressure-sensitive adhesive layers causes the optical compensation layer and the glass substrate to adhere to each other, and
- the adhesive strength of the pressure-sensitive adhesive layer A is larger than that of the pressure-sensitive adhesive layer B and a difference between the adhesive strengths of pressure-sensitive adhesive layers A and B is about 2 N/25 mm or more.

26. The polarizing plate of claim 25, wherein the adhesive strength of pressure-sensitive adhesive layer A exceeds 12 N/25 mm.

27. The polarizing plate of claim 26, wherein the adhesive strength of pressure-sensitive adhesive layer B is from 1 to 12 N/25 mm.

28. The polarizing plate of claim 25, wherein the adhesive strength of layer B is from 1 to 10 N/25 mm.

29. The polarizing plate of claim 28, wherein the adhesive strength of layer A exceeds 10 N/25 mm.

30. The polarizing plate with an optical compensation layer according to claim 25, wherein the optical compensation layer is a cholesteric layer whose constituent molecules are aligned while having a cholesteric structure.

31. The polarizing plate with an optical compensation layer according to claim 30, wherein the constituent molecules of the cholesteric layer are a liquid crystal monomer, the liquid crystal monomer is aligned while having the cholesteric structure, and the liquid crystal monomer is polymerized or cross-linked.

32. The polarizing plate with an optical compensation layer according to claim 31, wherein the cholesteric layer has a helical pitch of equal to or smaller than 0.25 μm.

33. The polarizing plate with an optical compensation layer according to claim 30, wherein the constituent molecules of the cholesteric layer are a liquid crystal polymer, and the liquid crystal polymer is aligned while having the cholesteric structure.

* * * * *